United States Patent [19]
Sato et al.

[11] Patent Number: 4,768,041
[45] Date of Patent: Aug. 30, 1988

[54] RECORDING APPARATUS

[75] Inventors: Tadashi Sato, Kokubunji; Yasuyuki Tamura, Yokohama, both of Japan

[73] Assignee: Canon Kabushiki Kaisha, Tokyo, Japan

[21] Appl. No.: 938,021

[22] Filed: Dec. 4, 1986

[30] Foreign Application Priority Data

| Dec. 9, 1985 | [JP] | Japan | 60-275084 |
| Dec. 9, 1985 | [JP] | Japan | 60-275085 |
| Dec. 9, 1985 | [JP] | Japan | 60-275086 |
| Dec. 9, 1985 | [JP] | Japan | 60-275087 |
| Dec. 9, 1985 | [JP] | Japan | 60-275088 |
| Dec. 9, 1985 | [JP] | Japan | 60-275089 |
| Dec. 9, 1985 | [JP] | Japan | 60-275090 |
| Dec. 9, 1985 | [JP] | Japan | 60-275091 |
| Dec. 23, 1985 | [JP] | Japan | 60-287831 |
| Dec. 23, 1985 | [JP] | Japan | 60-287832 |
| Dec. 23, 1985 | [JP] | Japan | 60-287833 |
| Dec. 23, 1985 | [JP] | Japan | 60-287834 |
| Dec. 23, 1985 | [JP] | Japan | 60-287835 |
| Dec. 23, 1985 | [JP] | Japan | 60-287836 |
| Dec. 23, 1985 | [JP] | Japan | 60-287837 |
| Dec. 23, 1985 | [JP] | Japan | 60-287838 |

[51] Int. Cl.⁴ ............................................. G01D 15/10
[52] U.S. Cl. ................................. 346/76 PH; 400/120
[58] Field of Search ............... 346/76 PH; 400/662, 400/120; 101/210, 267, 270

[56] References Cited

U.S. PATENT DOCUMENTS

| 4,359,748 | 11/1982 | Pasini et al. | 346/140 R |
| 4,437,102 | 3/1984 | Inui et al. | 346/76 PH |
| 4,453,839 | 6/1984 | Findlay et al. | 400/120 |
| 4,462,035 | 7/1984 | Koto | 346/76 PH |
| 4,561,789 | 12/1985 | Saito | 346/76 PH |
| 4,580,142 | 4/1986 | Matsushita et al. | 346/1.1 |

FOREIGN PATENT DOCUMENTS

| 17337 | 10/1966 | Japan . |
| 161946 | 12/1979 | Japan . |
| 28873 | 3/1981 | Japan . |
| 63477 | 5/1981 | Japan . |
| 151375 | 9/1982 | Japan . |
| 12790 | 2/1983 | Japan . |
| 220795 | 3/1983 | Japan . |
| 78782 | 5/1983 | Japan . |

OTHER PUBLICATIONS

Humphreys, "Color Wheel with Ink Platens", IBM Tech. Disclosure Bulletin, vol. 25, No. 4, p. 2193, Sep. 1982.

Primary Examiner—M. H. Paschall
Assistant Examiner—Morris Ginsburg
Attorney, Agent, or Firm—Fitzpatrick, Cella, Harper & Scinto

[57] ABSTRACT

A recording apparatus comprises a rotatable transfer medium to be heated, a recording system for heating the transfer medium and a press mechanism for effecting transfer of molten transfer medium onto a record medium. A distance between the heat position and the transfer position may be kept constant by a maintaining device. Additional transfer media may be held in the apparatus by a holding member. The plural transfer media may be identical or different in color.

34 Claims, 28 Drawing Sheets

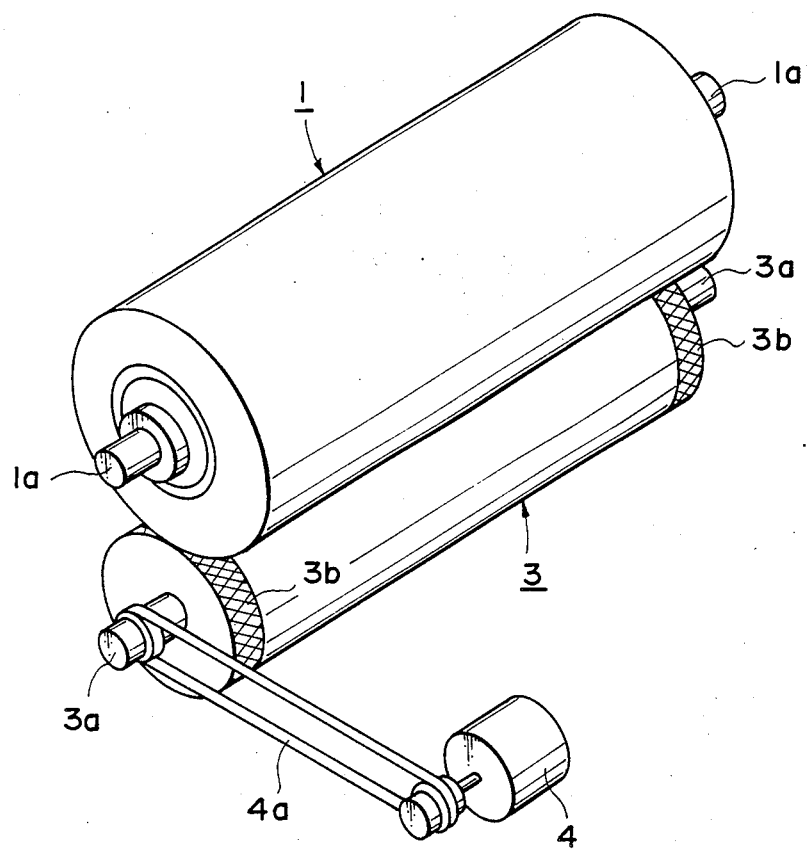
F I G. 3

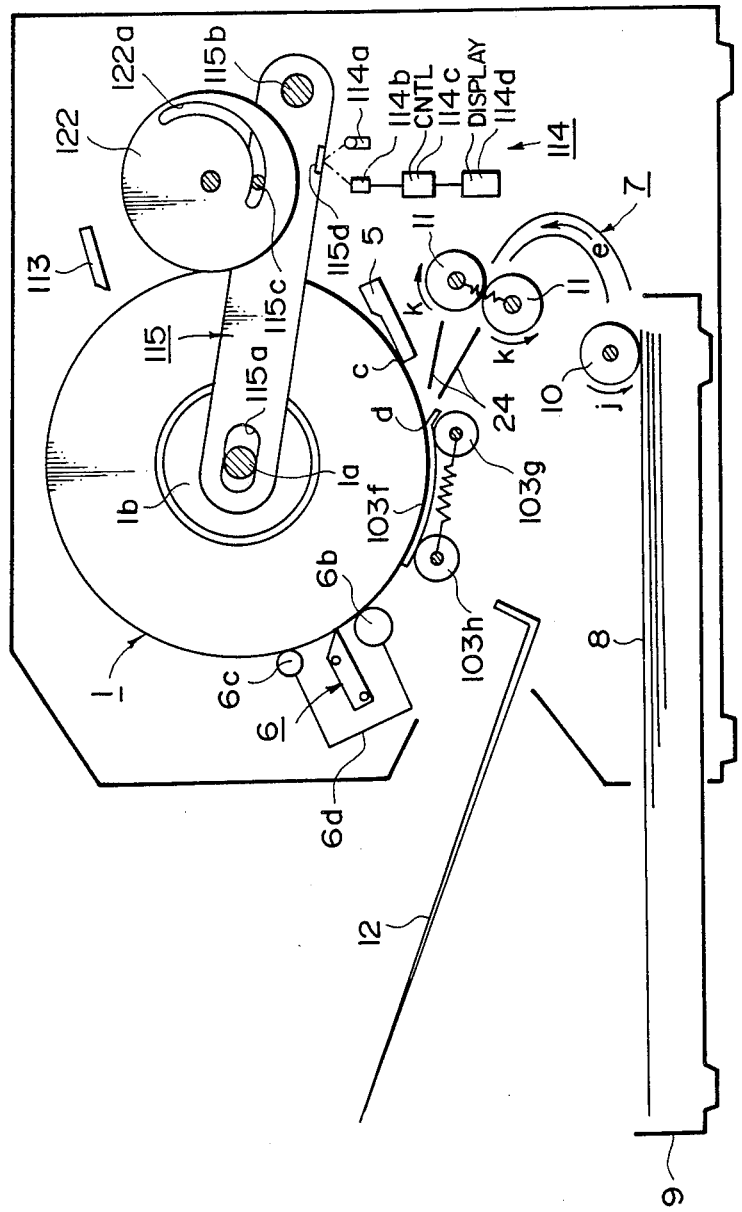
F I G. 21

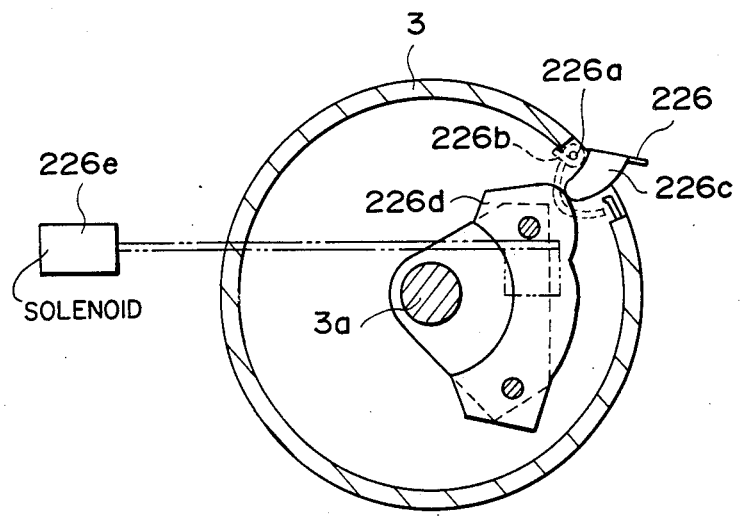
F I G. 27

RECORDING APPARATUS

BACKGROUND OF THE INVENTION

1. Field of the Invention

The present invention relates to a recording apparatus for heating a rotating transfer medium to perform transfer record operation.

2. Related Background Art

In recent years, a heat-sensitive recording method has been widespread and popular because of lightweight, compactness, and low noise and recording using normal paper.

A typical conventional heat-sensitive recording apparatus includes a transfer medium obtained by coating a heat-fusible ink on a heat-resistant base film to form an ink film. A record medium is placed on the ink film on the transfer medium, and the base film is heated by a record head heated according to image information, thereby melting the ink on the transfer medium according to an image pattern and hence performing transfer record for the record medium. This apparatus is disclosed in unexamined, published Japanese Patent Application Laid-open No. 220795/1983.

In the conventional heat-sensitive recording apparatus, the heat-fusible ink must be coated on a relatively expensive heat-resistant base film by a complicated process. Once the transfer medium is used, it normally serves as a disposable medium to increase the running cost. In addition, the heat-fusible ink must be heated through the base film which degrades heat efficiency.

Another conventional method is proposed wherein the heat-resistant base film comprises a conductive film so as to improve heat efficiency, a record head comprises electrodes selectively energized according to image information, and the ink is directly heated by Joule heat as disclosed in unexamined, published Japanese Patent Application Laid-open No. 12790/1983. With this arrangement, the base film tends to be more expensive.

The present applicant has developed a method of recording an image with high heat efficiency at a low running cost by solving the problems of the conventional apparatuses and filed Japanese patent applications (Japanese Patent Application Nos. 168788/1985 (filed July 31, 1985) and 295311/1985 (filed Dec. 25, 1985)), although they are not laid-open yet. The present applicant filed a U.S. application (U.S. application Ser. No. 887,914) claiming the priority based on above Japanese applications.

The invention of the present application is an improved invention of the prior applications filed by the present applicant. Therefore, the materials and the record process, all of which were adopted by the present applicant in the prior applications, will be used in the following embodiments of the present invention.

SUMMARY OF THE INVENTION

It is an object of the present invention to provide a recording apparatus at a low running cost.

It is another object of the present invention to provide a recording apparatus with high heat efficiency.

It is still another object of the present invention to provide a recording apparatus capable of performing more accurate transfer record.

It is still another object of the present invention to provide a recording apparatus comprising supplementary transfer media.

It is still another object of the present invention to provide a recording apparatus capable of forming a full-color recorded image.

BRIEF DESCRIPTION OF THE DRAWINGS

FIG. 3 is a perspective view showing the relationship between an ink roller and a pressure roller;

FIGS. 4A to 4C show a record head, in which FIG. 4A is an exploded view thereof, FIG. 4B is a perspective view showing an assembled state thereof, and FIG. 4C is a schematic view for explaining sliding of the record head when the ink roller diameter is gradually reduced;

FIGS. 8A and 8B show operations of the regulating member and a smoothing blade, in which FIG. 8A is a sectional view showing a mechanism near the center of the ink roller and FIG. 8B is a sectional view near both ends of the ink roller;

FIG. 21 is a schematic sectional view of a recording apparatus according to still another embodiment of the present invention;

FIG. 27 is a sectional view for explaining the arrangement of grippers in the apparatus in FIG. 26.

DETAILED DESCRIPTION OF THE PREFERRED EMBODIMENTS

Recording apparatuses using the above means according to preferred embodiments of the present invention will be described with reference to the accompanying drawings.

Figure 1:
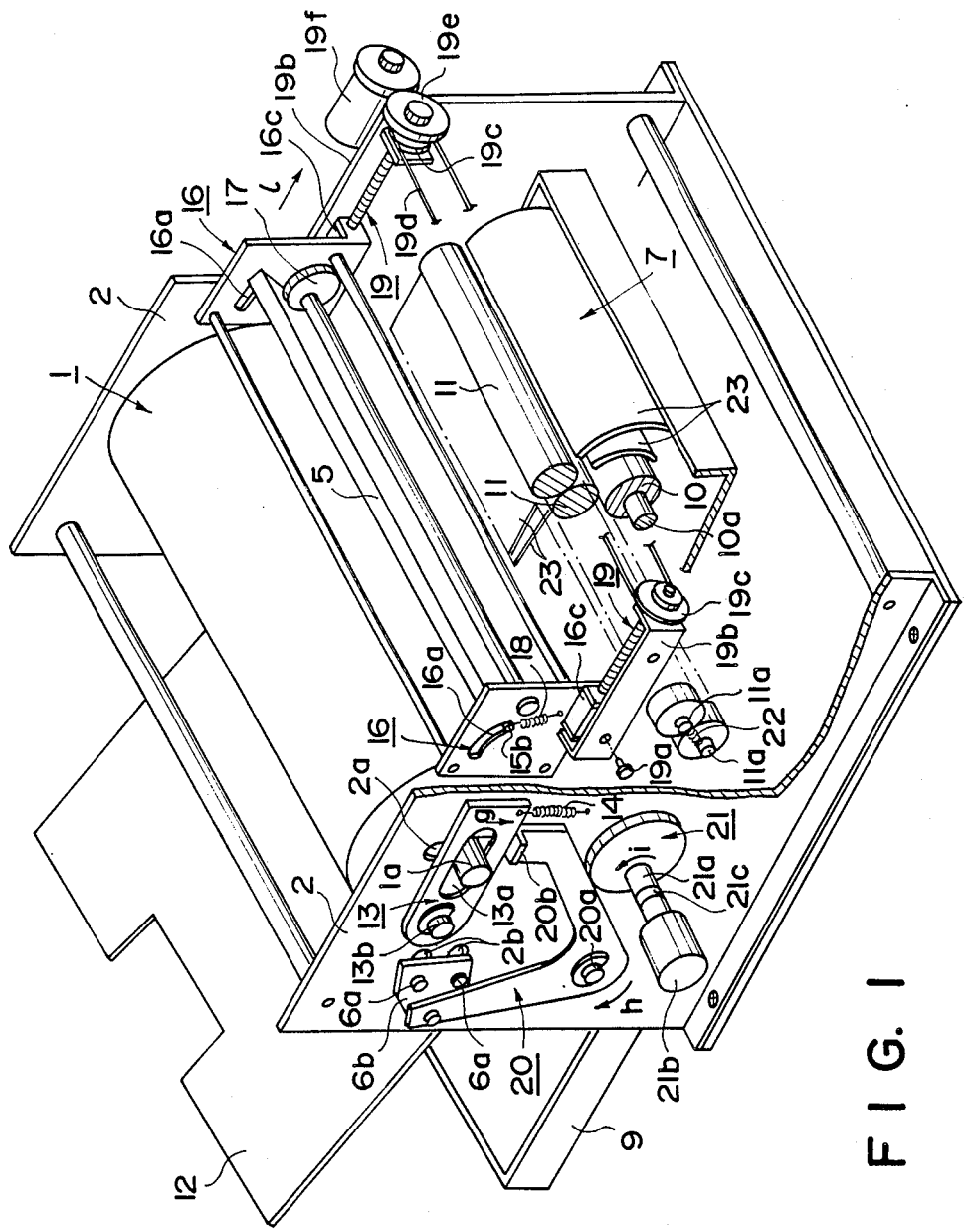
FIG. 1 is a partially cutaway perspective view of a recording apparatus according to an embodiment of the present invention.
Figure 2:
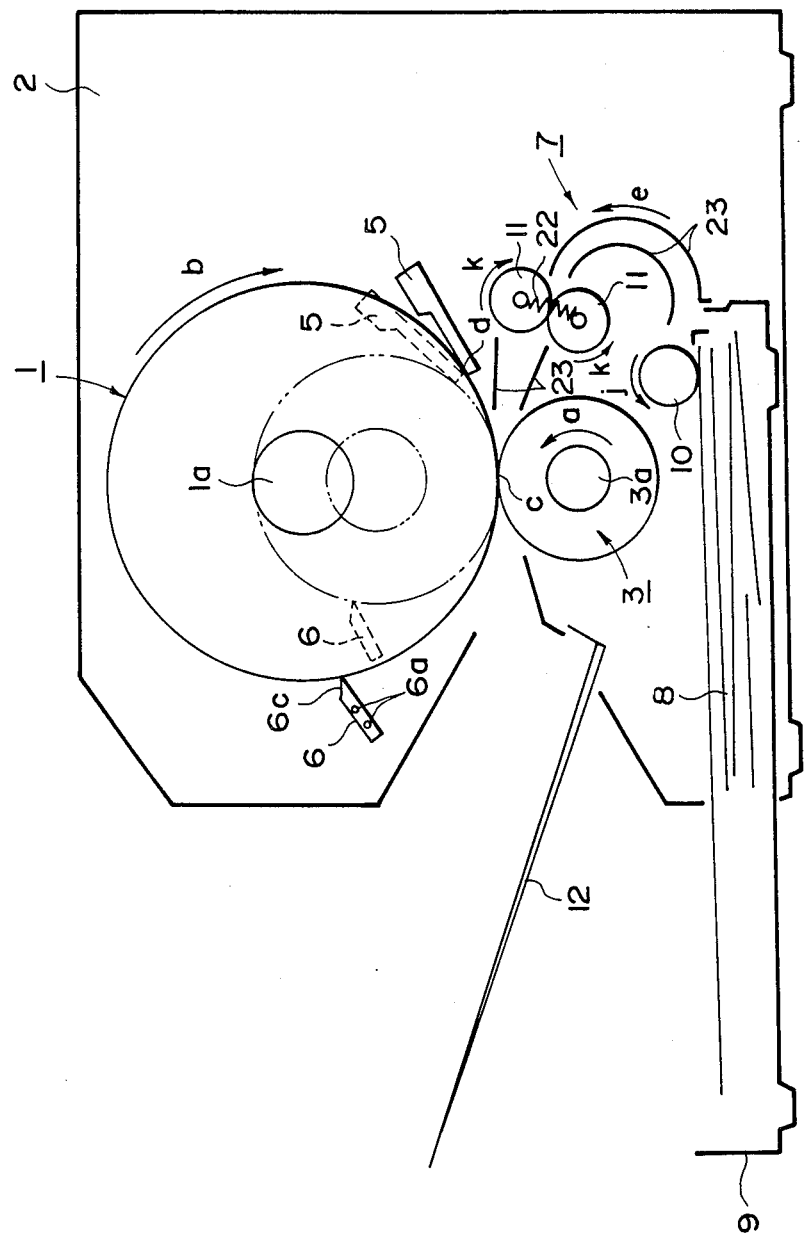
FIG. 2 is a schematic sectional view of the recording apparatus in FIG. 1.

FIG. 1 is a partially cutaway perspective view of a recording apparatus according to an embodiment of the present invention, and FIG. 2 is a schematic sectional view thereof.

The overall construction of the apparatus will be described below. The apparatus comprises an ink roller 1 serving as a transfer medium. A supercoolable ink is coated and solidified on a core 1a in a roll-like shape. The core 1a is pivotally supported by side plates 2 and can be slid downward upon a decrease in ink roller diameter.

A pressure member brought into tight contact with the ink roller 1 comprises a pressure roller 3. The pressure roller 3 is driven stepwise or continuously by * a stepping motor 4 in a direction of arrow a to rotate the ink roller 1 in a direction of arrow b.

A record head 5 is arranged at the upstream side of the rotational direction of the ink roller 1 with respect to a pressure contact portion c between the ink and pressure rollers 1 and 3 (to be referred to as a pressure contact portion c for brevity hereinafter). The record head 5 is brought into line contact with the surface of the ink roller 1 along the axial direction thereof. When the diameter of the ink roller 1 is decreased, a contact portion d between the ink roller 1 and the record head 5 (to be referred to as a contact portion d for brevity hereinafter) is moved upward, so that the arc length between the contact portion d and the pressure contact portion c is kept unchanged.

A smoothing blade 6 is disposed at the downstream side of the rotational direction of the ink roller 1 with respect to the pressure contact portion c. The smoothing blade 6 scrapes the particles or indentations left on the surface of the ink roller 1 after the ink on the ink roller 1 is transferred to the record medium and smooths the surface by heating under pressure The distal end of the smoothing blade 6 is in contact with the surface of the ink roller 1. The smoothing blade 6 is mounted on the side plates 2 such that the blade 6 is slid upon a decrease in diameter of the roller 1.

A conveying means 7 conveys a record sheet 8 as the record medium in a direction of arrow e during record operation. The conveying means 7 cooperates with a paper feed roller 10 to pick up the record sheets 8 from a cassette 9 one by one. The conveying means 7 also cooperates with timing rollers 11 to convey the record sheet at a proper timing. The record sheet 8 conveyed by the conveying means 7 is subjected to record operation when it passes between the ink roller 1 and the pressure roller 3. The recorded sheet is delivered outside onto a sheet tray 12.

The respective components of the recording apparatus will be described in detail.

The ink roller 1 will be first described. The ink on the ink roller 1 has the supercooling property, as described above. The supercoolable ink is defined as follows. When the ink is heated, melted or softened, and then cooled, the ink maintains a softening or viscous state enough to allow transfer of the ink onto the record sheet 8 even at a temperature below the melting or softening point. A colorant containing a dye and a pigment (e.g., carbon black) used in printing or other record operations singly or in a combination of at least two components is dispersed in a supercoolable heat-fusible binder to prepare the supercoolable ink.

Such supercoolable heat-fusible binders may be obtained by mixing one, or two or more species of known supercoolable substances including plasticizers such as N-cyclohexyl-p-toluenesulfonamide, N-ethyl-p-toluenesulfonamide, benzotriazole, acetanilide, and derivatives of these substances, within a conventional heat-transferable ink, e.g., a thermoplastic resin such as a polyamide resin, an acrylic resin, polyvinyl acetate resin or a copolymer of these, or natural or synthetic wax of various species. The supercoolable heat-fusible binder of the present invention is solidified in a mold in a roll-like shape to prepare the ink roller 1.

The content of the supercoolable substance is 20 to 90 parts by weight, and the content of the conventional heat-fusible binder is 10 to 90 parts by weight. Furthermore, an oil or the like may be added to the supercoolable heat-fusible binder to control the supercooling properties. An elastomer or the like may be added to the binder to control a melting viscosity and an adhesion force.

The melting or softening point of the supercoolable ink falls within the range of about 40° to 200° C. and more preferably about 50° to 180° C. A period required for restarting solidification after the ink is heated over the melting or softening point, melted or softened, and then exposed at room temperature is about 0.1 to 100 seconds and more preferably about 0.1 to 10 seconds.

Both ends of the core 1a of the ink roller 1 are inserted in vertical elongated holes 2a formed in the side plates 2 and in horizontal elongated holes 13a formed in pivot plates 13. Each pivot plate 13 is pivotal about a shaft 13b at one end thereof. The other end of the pivot plate 13 is biased downward by a corresponding spring 14. Therefore, the ink roller 1 is always biased downward and is normally in tight contact with the pressure roller 3 disposed below the ink roller 1.

Both ends of a shaft 3a of the pressure roller 3 are pivotally supported by the side plates 2, and one end of the shaft 3a is coupled to the stepping motor 4 through a belt 4a, as shown in FIG. 3. The pressure roller 3 is rotated upon operation of the stepping motor 4. Knurled portions 3b are formed at both longitudinal ends of the pressure roller 3. Upon rotation of the pressure roller 3, the knurled portions 3b catch the ink roller 1 so that the ink roller 1 can be driven.

Figure 4A:
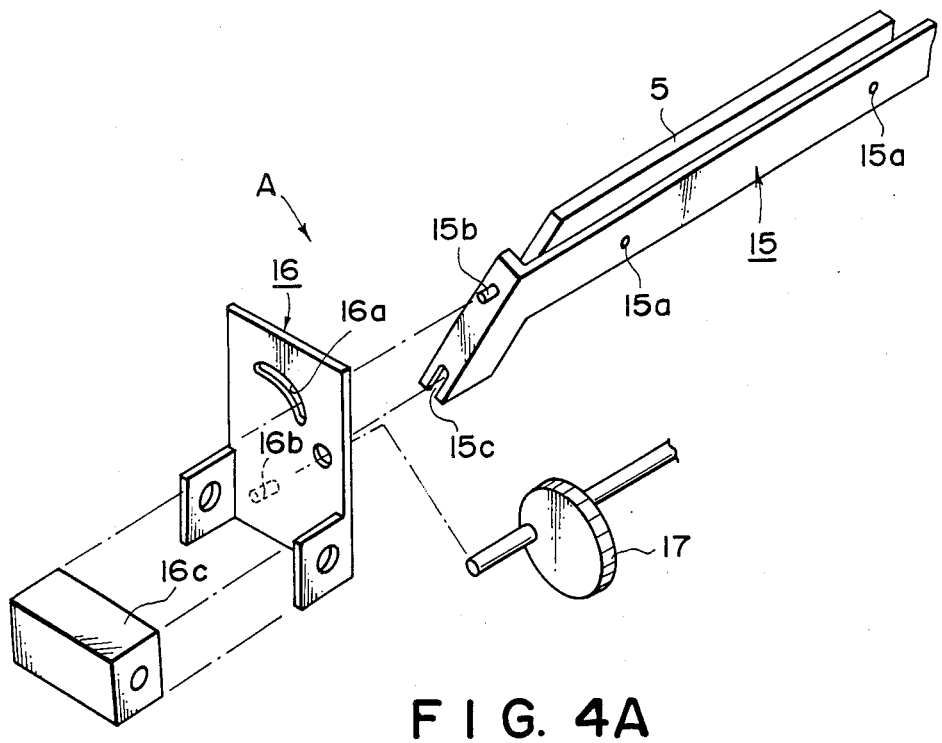
Figure 4B:
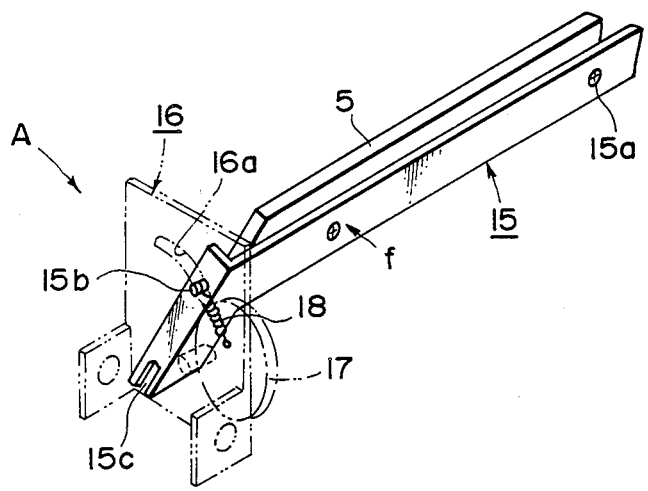

The record head 5 will be described below. A plurality of heating elements (not shown) heated on the basis of the image information are arranged in the head 5. The record head 5 has the same length as that of the ink roller 1 along the longitudinal direction thereof and can be slid by a sliding means A, as shown in FIGS. 4A and 4B.

The record head 5 is fixed on a support 15 by screws 15a. Guide projections 15b extend on the end faces of the support 15, respectively. U-shaped notches 15c are formed at the lower portions of both ends of the support 15. The projections 15b and the notches 15c formed on and in the support 15 are locked with arcuate elongated holes 16a and support projections 16b formed in and on the support side plates 16, respectively. Therefore, the support 15 can be supported by the support side plates 16. When the support 15 is biased in a direction of arrow f by eccentric cams 17 pivoted by a motor (not shown), the guide projections 15b are slid along the arcuated elongated holes 16a while the support projections 16b serve as the pivot points. Springs 18 are hooked between one guide projection 15b and the corresponding support side plate 16 and the other guide projection 15b and the corresponding support side plate 16, respectively. The guide projections 15b are biased in the −f (where a minus symbol indicates the reverse direction) direction.

Figure 4C:
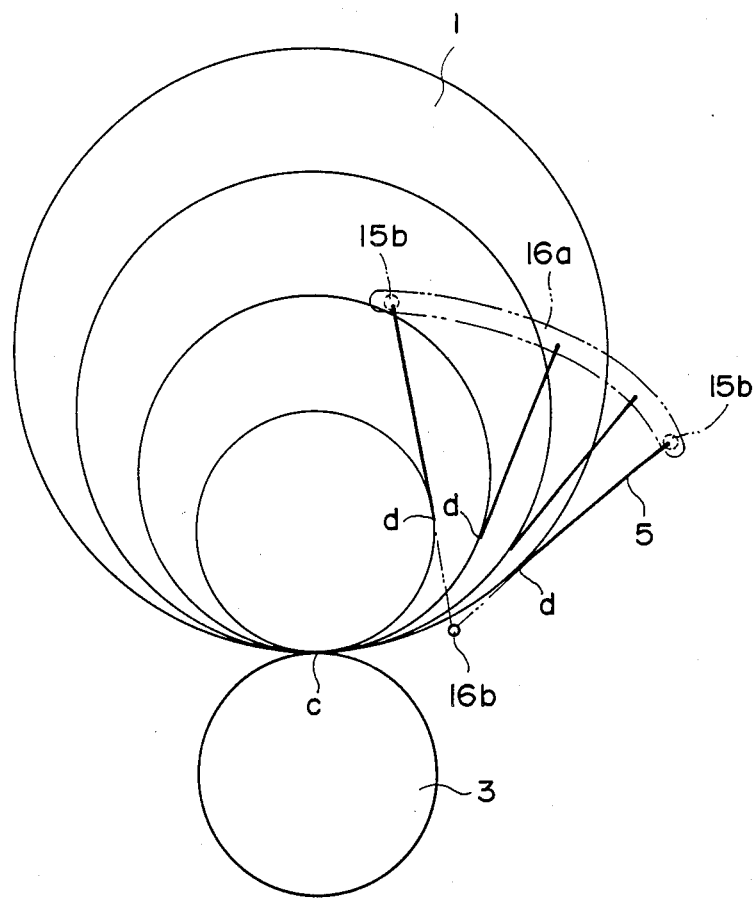

Each arcuated elongated hole 16a has a shape for guiding the guide projection 15b, as shown in FIG. 4C. When the guide projection 15b is slid and pivoted about the support projection 16b upon a decrease in ink roller diameter, the arc length of the ink roller 1 from the contact portion d to the pressure contact portion c and an angle formed between the record head 5 and a normal at the contact portion d are kept unchanged.

Nut members 16c are fixed to the outer surfaces of the support side plates 16 respectively. The nut members 16c are threadably engaged with corresponding lead screw members 19. As shown in FIG. 1, the lead screw members 19 are rotatably held by substantially U-shaped holding members 19b at determined positions of the side plates 2 by screws 19a, respectively. Pulleys 19c are fixed to ends of the lead screw members 19, respectively. A belt 19d is looped between the pulleys 19c. A gear 19e is mounted on the end of one of the lead screw members 19. The lead screw members 19 are rotated upon driving of a motor 19f coupled to the gear 19e. Therefore, the nut members 16c are slid along the lead screw members 19, respectively, and the record head 5 is slid in a direction perpendicular to the axial direction of the ink roller 1.

The smoothing blade 6 has the same length as that of the ink roller 1. As shown in FIG. 2, the outer surface of the ink roller 1 is heated upon energization of a Nichrome wire 6c, as shown in FIG. 2. The blade 6 has a knife-like shape for slightly cutting or slicing the surface of the ink roller 1. Two sliding projections 6a extend on the outer surface of each end of the smoothing blade 6. The sliding projections 6a are adapted to be slidably inserted guide holes 2b formed in the corresponding one of the side plates 2.

As shown in FIG. 1, connecting plates 6b are mounted on the sliding projections 6a at both ends of the smoothing blade 6. One end of each of link members 20 is pivotally mounted on the corresponding connecting plate 6b. The link members 20 comprise L-shaped members, respectively. Each link member 20 is supported by the corresponding side plate 2 and is pivoted about a corresponding link shaft 20a. The other end 20b of each link member 20 is brought into contact with the lower end of the corresponding pivot plate 13. Therefore, when the diameter of the ink roller 1 is decreased to rotate the pivot plates 13 in a direction of arrow g, the link members 20 are rotated in a direction of arrow h, thereby causing the smoothing blade 6 to slide along guide holes 2b.

An eccentric cam 21 is mounted to abut against the lower end of each link member 20. The eccentric cam 21 is rotatably mounted by the corresponding side plate 2 below the link member 20 abutting against the corresponding pivot plate 13. A rotating shaft 21a of the eccentric cam 21 is connected to a motor 21b through a one-way clutch 21c. Therefore, the link members 20 can be rotated in the −h direction.

The arrangement of the sheet conveying means 7 is shown in FIGS. 1 and 2. The feed roller 10 and the timing rollers 11 have a length larger than the width of the record sheet 8. Shafts 10a and 11a extend through the rollers 10 and 11, respectively. Both ends of each of the shafts 10a and 11a are rotatably supported by the side plates 2. Upon rotation of the motor 4 for rotating the pressure roller 3, the rollers 10 and 11 are rotated. The feed roller 10 is disposed at a position where the roller 10 is in tight contact with the uppermost sheet when the record sheets 8 are stored in the cassette 9 and the cassette 9 is attached to the apparatus. The feed roller 10 picks up the record sheets 8 one by one upon its rotation in a direction of arrow j in synchronism with record operation.

The timing rollers 11 are rotated in a direction of arrow k in synchronism with rotation of the pressure roller 3 operated in response to record operation. Upon rotation of the timing rollers 11, the record sheet 8 is conveyed between the ink roller 1 and the pressure roller 3. The timing rollers 11 comprise metal rollers made of stainless steel or iron. Tension springs 22 are hooked between the shafts 11a of the rollers 11 at both ends so as to bring the rollers 11 into contact with each other. In this embodiment, the biasing force of the tension spring 22 is set to be 16 kg/cm² or more.

Sheet guides 23 are disposed between the feed roller 10 and the timing rollers 11 and between the timing rollers 11 and the pressure roller 3 to guide the conveyed record sheet 8.

The operation of the recording apparatus having the construction described above will be described below.

Upon operation of the motor 4, the pressure roller 3 is rotated in the direction of arrow a. Upon rotation of the roller 3, the ink roller 1 is rotated in a direction of arrow b. At the same time, the record head 5 is heated according to the image information and melts the ink on the surface of the ink roller 1 according to the image pattern. The ink is maintained in a melted state and reaches the pressure contact portion c upon rotation of the ink roller 1. Simultaneously, the feed roller 10 and the timing rollers 11 are rotated in the directions of arrows j and k, respectively, to pick up the uppermost sheet 8 from the cassette 9. The picked sheet is conveyed in the pressure contact portion c. The ink melted in the image pattern is transferred to the record sheet 8. The record sheet 8 having the determined image is delivered outside onto the sheet tray 12 upon rotation of the ink and pressure rollers 1 and 3.

Small particles or indentations are left on the surface of the ink roller after transfer record operation is performed. When the ink roller 1 is rotated and reaches the smoothing blade 6, the surface of the roller 1 is cut or smoothed with heating by the blade 6. The indentations on the surface of the roller 1 can be removed to obtain a smooth surface, thereby allowing continuous transfer record.

When record operation progresses, the diameter of the ink roller 1 is decreased by ink transfer and cutting by the smoothing blade 6. The core 1a of the ink roller 1 is slid along the elongated holes 2a upon a decrease in ink roller diameter. Therefore, the contact force between the ink roller 1 and the pressure roller 3 can be maintained constant although the diameter of the ink roller 1 is decreased. In this case, the ink roller 1 is driven by the pressure roller 3, so that the peripheral speed of the ink roller 1 can be kept unchanged if the pressure roller 3 is rotated at a constant speed. When the core 1a is slid, the pivot plates 13 are rotated in the direction of arrow g. Each link member 20, one end 20b of which is in contact with the lower end of the corresponding pivot plate 13, is rotated in the direction of arrow h. The sliding projections 6a on the smoothing blade 6 are slid along the guide holes 2b toward a direction of the ink roller 1. Therefore, the smoothing blade 6 is also kept in contact with the surface of the ink roller 1.

Since the record head 5 is biased by the eccentric cams 17 in the direction of arrow f, the record head 5 is shifted upon a decrease in ink roller diameter such that the guide projections 15b on the support 15 are slid along the arcuate elongated holes 16a while the support projections 16b on the support side plates 16 serve as pivot points. Therefore, the angle between a normal at the contact portion d of the ink roller 1 and record head 5 and the arc length from the contact portion d to the pressure contact portion c are always kept unchanged.

At the time of conveyance of the record sheet 8, the record sheet 8 fed from the feed roller 10 receives a pressure from the timing rollers 11 when the sheet 8 passes therethrough. If the record sheet 8 comprises paper, small fibers extending on the surfaces of the paper sheet and paper dust are inserted inside the texture of the paper sheet by the pressure. Therefore, even if the surfaces of the record sheet 8 are not smooth like a fluff, smoothness of the surfaces of the sheet can be improved when the paper sheet passes between the timing rollers 11. Therefore, a blank area caused by poor transfer can be prevented.

When the same pressure as the fixing pressure in a copying machine is applied to the surfaces of the sheet, smoothness of the sheet can be improved.

In order to smooth the surfaces of the record sheet 8 by pressure contact, it is more effective to use metal rollers as the timing rollers 11. However, one of the rollers 11 which is in contact with the ink roller 1 through the record sheet 8 comprises a metal roller. The other timing roller may be made of hard rubber or hard plastic to obtain the same effect as described above. If a hard rubber or plastic roller 11 is used, a pad for collecting small dust particles such as paper dust particles is placed under the rollers 11.

In a non-record state, in order to maintain circularity of the roller 1, it is preferable not to apply a pressure on the surface of the ink roller 1. For this purpose, the motor 21b is rotated in the direction of arrow i. In this case, the one-way clutch 21c is locked, and the eccentric cams 21 are rotated in the direction of arrow i. The link members 20 are rotated in the −h direction. The pivot plates 13 are rotated in the −g direction to move the ink roller 1 upward. Therefore, the ink roller 1 is separated from the pressure roller 3. At the same time, the smoothing blade 6 is also separated from the surface of the ink roller 1 upon rotation of the link members 20. In this state, the motor 19f is driven to rotate the lead screw members 19 in the determined direction. The nut members 16 threadably engaged with the lead screw members 19 are slid in a direction of l, thereby separating the record head 5 from the ink roller 1. In the recording apparatus of this embodiment, the surface of the ink roller 1 is separated from other members in the non-record state. Therefore, pressure is not applied to the surface of the ink roller 1 to maintain circularity of the ink roller 1.

The transfer medium in this embodiment is exemplified by the ink roller. However, the transfer medium is not limited to a roller-like member. The transfer medium may prepared such that the supercoolable ink is applied to a rotary drum or an endless belt.

The pressure roller 3, the feed roller 10, and the timing rollers 11 are not limited to roller-like members, but may be constituted by endless belts to obtain the same effect as described above.

If a silicone resin is coated on the heating portion of the record head 5, the ink melted upon energization is not attached to the record head 5. In addition, the record head 5 can be more smoothly in sliding contact with the ink roller 1.

In the above embodiment, the smoothing member is exemplified by the smoothing blade 6. However, the surface of the ink roller 1 may be smoothed by bringing a heat roller into contact therewith.

In the above embodiment, the record sheets 8 are stored in the cassette 9. However, the record sheets 8 may be placed in a deck or on a manual feed tray.

According to the embodiment described above, the rotary transfer medium is heated by the record head, so that an expensive base film as in the conventional arrangement need not be used. In addition, heat efficiency for the transfer medium can be improved, and the running cost can be greatly reduced. The heating position of the transfer medium by means of the record head is shifted according to changes in outer diameters of the transfer medium, and the arc length from the heating position to the transfer position is always kept unchanged. When the record medium is conveyed according to determined record operation, the transfer record can be always performed at the accurate position. A complicated control mechanism or the like need not be used. The record medium is clamped by cooperation of the transfer medium and the pressure member, and at the same time transfer record is performed, thereby increasing the transfer speed.

Figure 5:
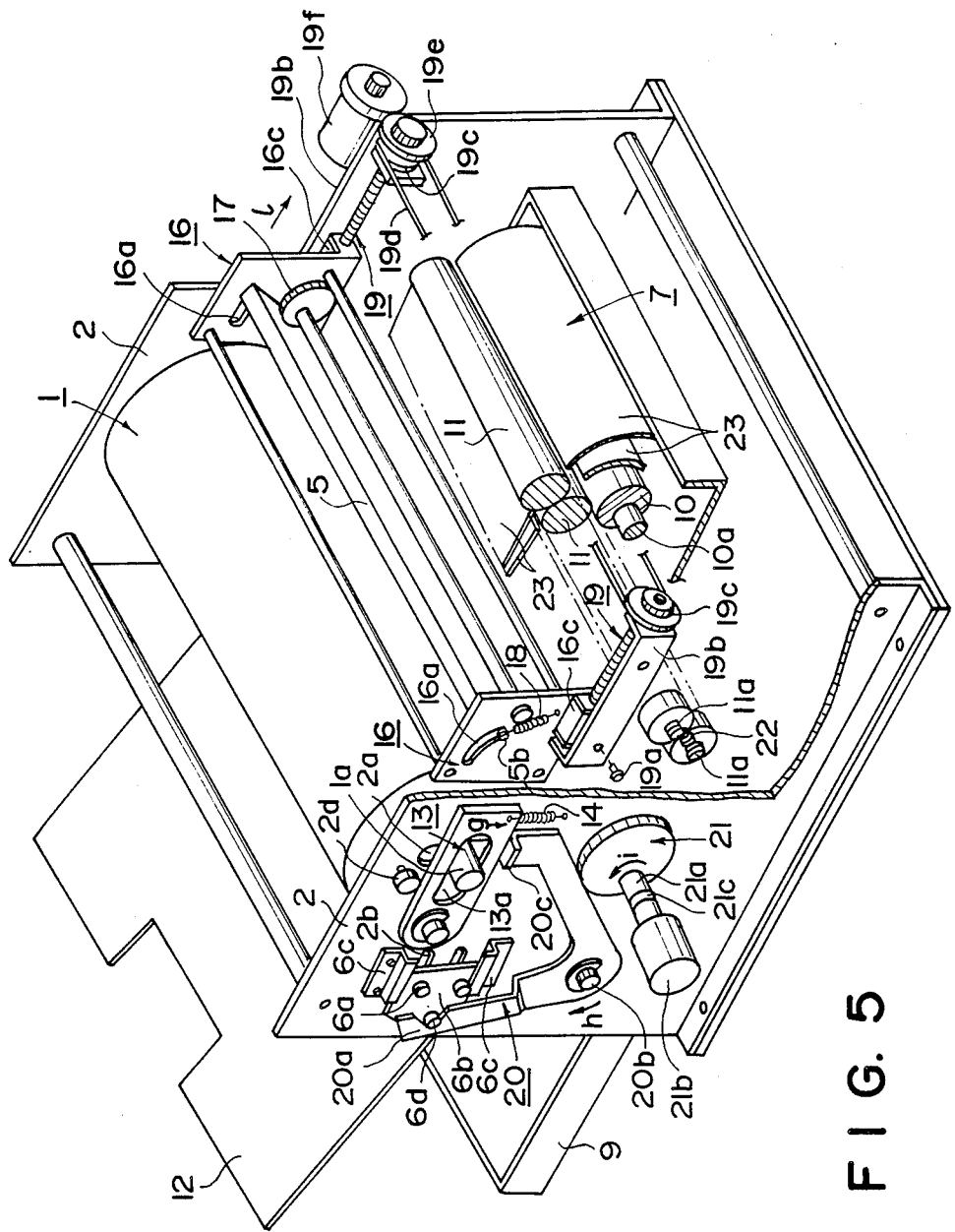
FIG. 5 is a partially cutaway perspective view of a recording apparatus according to another embodiment of the present invention.

Another embodiment of the present invention will be described with reference to FIGS. 5 and 6.

This embodiment provides a means for separating a record head and a pressure member from the surface of a transfer medium while a smoothing member for smoothing the surface of the transfer medium is kept in contact therewith. The same reference numerals as in the following embodiments denote the same parts in the previous embodiment, and a detailed description thereof will be omitted.

In this embodiment, each pivot plate 13 is rotated in a direction of arrow g upon sliding of a core 1a, Each link member 20, one end 20c of which is in contact with the lower end of the pivot plate 13, is rotated in a direction of arrow h. A locking projection 6c is moved upward to cause a sliding plate 6b and sliding projections 6a to slide along a sliding portion 6c and guide holes 2b.

A smoothing blade 6 is kept in contact with the surface of the ink roller even if its diameter is changed. As shown in FIG. 6, a pressure roller 3 is designed such that both ends of a shaft 3a extending through the pressure roller 3 are rotatably supported by side plates 2, respectively, that one end of the shaft 3a is coupled to a stepping motor 4 through a belt 4a, and that the roller 3 is rotated upon driving of the motor 4. Knurled portions 3b are respectively formed at the longitudinal end portions of the pressure roller 3. When the pressure roller 3 is rotated, the knurled portions 3b catch the ink roller 1, so that the ink roller 1 is driven.

Figure 6:
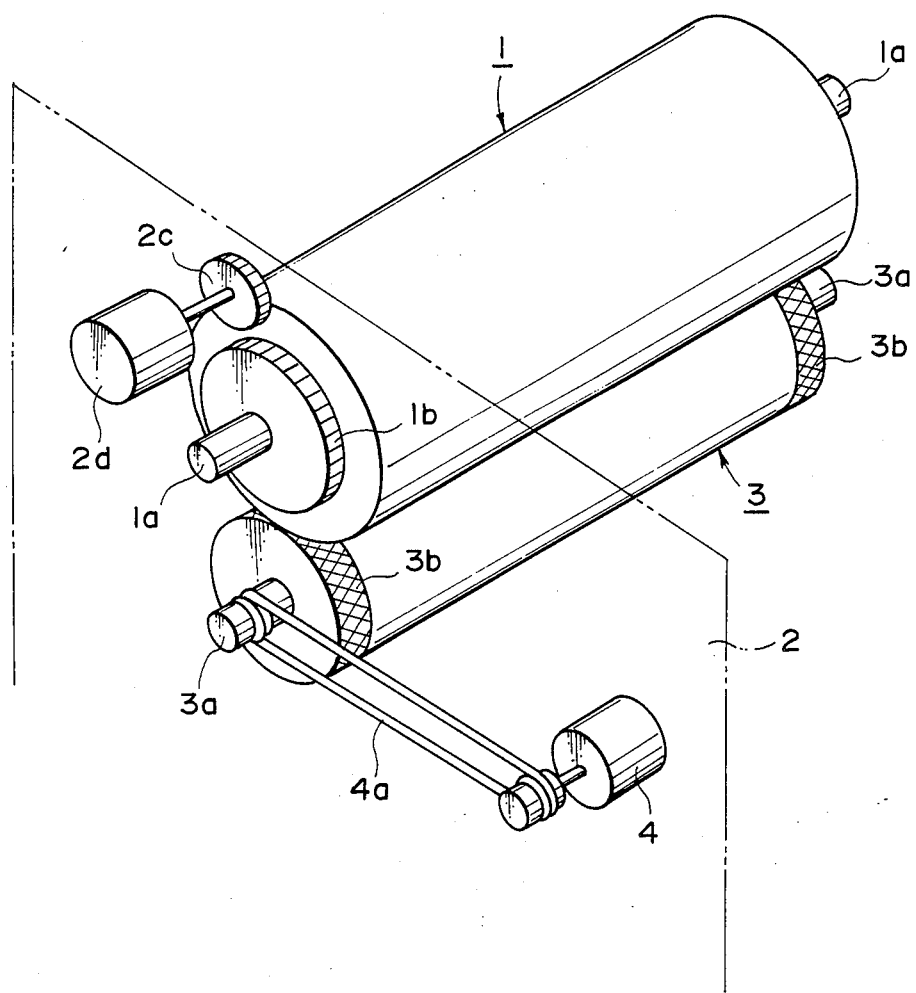
FIG. 6 is a view for explaining the relationship between an ink roller and a pressure roller in the apparatus of FIG. 5.

As shown in FIG. 6, a gear 1b is mounted on one longitudinal end of the ink roller 1. A gear 2c is mounted on one side plate 2. The gear 2c mounted on the side plate 2 is located above the gear 1b. When the ink roller 1 is slid upward along a vertical elongate hole 2a formed in each side plate 2, the gears 1b and 2c are meshed with each other. In this case, the rotational force is transmitted from a motor 2d to the ink roller 1 through the gear 2c coupled to the motor 2d.

In order to remove particles such as paper dust particles attached to the surface of the ink roller 1, a motor 21b is rotated in a direction of arrow i. In this case, a one-way clutch 21c is locked to rotate eccentric cams 21 in the −h direction and hence pivot plates 13 in the −g direction. The ink roller 1 is moved upward to release engagement between the ink roller 1 and the pressure roller 3. At the same time, the gear 1b of the ink roller 1 is meshed with the gear 2c, and a motor 19f is driven to rotate lead screw members 19 in a determined direction. Nut members 16c threadably engaged with the lead screw members 19 are slid in a direction of arrow l, so that the record head 5 is separated from the ink roller 1, It should be noted that sliding plate 6b need not be slid even if the link members 20 are rotated in the −h direction. In this manner, the smoothing blade 6 is kept in contact with the surface of the ink roller 1.

When a motor 2d is driven in response to a determined signal to rotate the ink roller 1, the surface of the ink roller 1 is cut or sliced by the smoothing blade 6 to remove the particles therefrom.

In the case of removing the particles or the like, only the smoothing blade 6 is kept in contact with the surface of the ink roller 1, and the pressure roller 3 and the record head 5 are kept separate from the surface of the ink roller 1, thereby preventing wear of the record head 5 or the like.

In this embodiment, the sliding plate 6b is slid along the sliding portion 6c by the urging force of the link member 20. Even if the urging force of the link member 20 is removed, the sliding portion 6c is kept in contact with the surface of the ink roller. If the sliding portion 6c is designed such that a felt or rubber friction member is attached to the sliding portion 6c to allow siding of the sliding plate 6b along the friction member, the sliding plate 6b is kept in position more accurately even if the urging force of the link member 20 is removed.

In order to remove particles attached to the surface of the transfer medium in this embodiment, the record head can be separated from the surface of the transfer medium, and the wear of the record head can be reduced.

Figure 7:
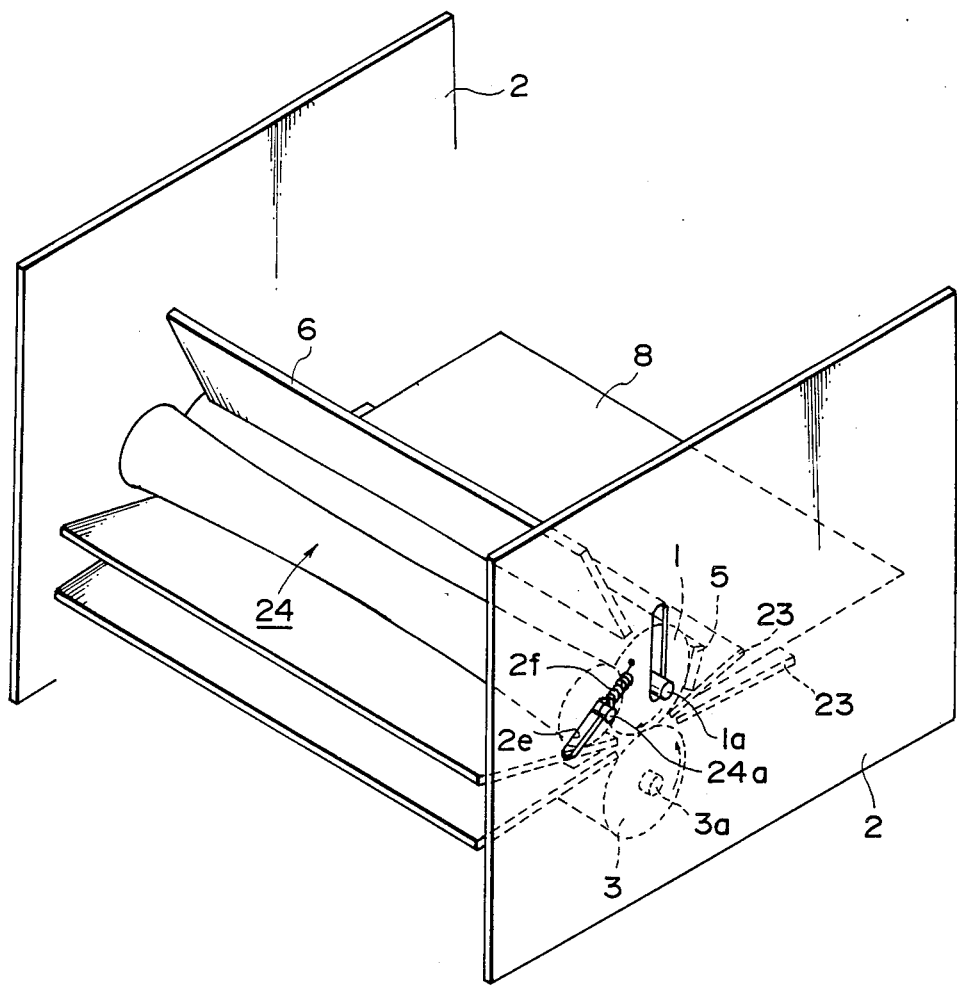
FIG. 7 is a perspective view for explaining a regulating member in the apparatus of FIG. 5.

Still another embodiment of the present invention will be described with reference to FIGS. 7 to 9.

In addition to the arrangement of the previous embodiments, this embodiment also includes a regulating member of an inverted crown-like or center-contracted shape brought into tight contact with the surface of the transfer medium to prevent misalignment of the transfer medium outside the axial range. A regulating member 24 comprises an inverted crown-like roller. The member 24 has substantially the same longitudinal length as that of an ink roller 1, as shown in FIG. 9. The diameter of the regulating member 24 is decreased toward its center. A shaft 24a extending through the regulating member 24 is rotatably inserted in elongated holes 2e formed in side plates 2. The shaft 24a is pulled by each spring 2f forward in the direction of the ink roller 1. The inverted crown-like regulating member 24 is always in tight contact with the surface of the ink roller 1. The regulating member 24 is driven by the ink roller 1.

In this embodiment, the surface of the ink roller 1 is smoothed by the inverted crown-like regulating member 24 before the surface is smoothed by a smoothing blade 6. The ink roller 1 is deformed such that the ink thereon flows toward the center according to the shape of the regulating member 24. Therefore, the ink does not flow from the longitudinal ends of the ink roller 1. As a result, the ink roller 1 is not elongated along the longitudinal direction thereof.

Figures 8A, 8B:
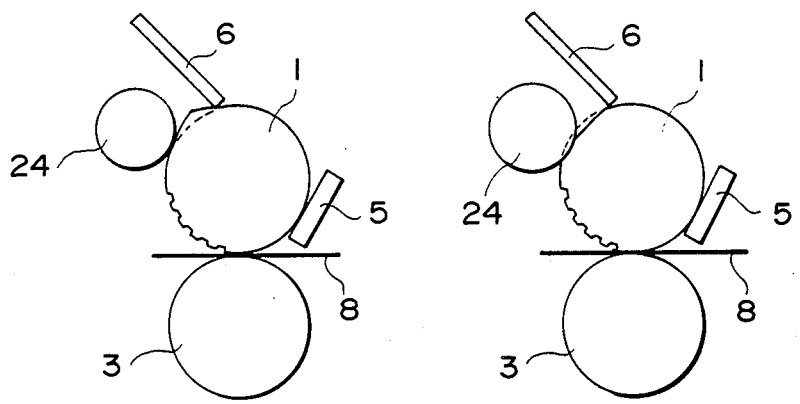

As shown in FIGS. 8A and 8B, the surface of the ink roller deformed in a drum-like or center-swelling shape, the central portion of which has a larger diameter than that of the end portion, is smoothed to be linear along the longitudinal direction by the smoothing blade 6.

When record operation progresses, the diameter of the ink roller 1 is decreased by ink transfer and cutting by the smoothing blade 6. However, both ends of the core 1a of the ink roller 1 are slid along the vertical elongated holes 2a upon a decrease in roller diameter. Therefore, the ink roller 1 and the pressure roller 3 are kept in tight contact at a determined pressure even if the roller diameter is changed.

Since the regulating member 24 is pulled by the springs 2f toward the direction of the ink roller 1, the decrease in ink roller diameter allows sliding of the shaft 24a along the elongated holes 2e. Therefore, the regulating member 24 is kept in tight contact with the surface of the ink roller at a determined pressure.

In order to remove particles such as paper dust particles attached to the surface of the ink roller 1, a motor 21b is rotated in a direction of arrow i. In this case, a one-way clutch 21c is locked to rotate eccentric cams 21 in the −h direction and hence pivot plates 13 in the −g direction. The ink roller 1 is moved upward to release engagement between the ink roller 1 and the pressure roller 3. At the same time, the gear 1b of the ink roller 1 is meshed with the gear 2c, and a motor 19f is driven to rotate lead screw members 19 in a determined direction. Nut members 16c threadably engaged with the lead screw members 19 are slid in a direction of arrow l, so that the record head 5 is separated from the ink roller 1. It should be noted that sliding plate 6b is not slid even if the link member 20 is rotated in the −h direction. In this manner, the smoothing blade 6 is kept in contact with the surface of the ink roller 1. Therefore, the regulating member 24 is kept in tight contact with the surface of the ink roller 1.

In the above state, when the motor 2d is driven in response to a determined signal, the ink roller 1 is rotated, and the surface thereof is cut by the smoothing blade 6, thereby removing the particles from the surface of the ink roller 1. In this case, an extension of the ink film on the ink roller 1 outside the ends thereof along the longitudinal direction can be prevented by the regulating member 24.

In the case of removing the particles from the surface of the ink roller 1, the pressure roller 3 and the record head 5 are separated from the surface of the ink roller 1, and wear of the record head 5 or the like can be prevented.

Figure 9:
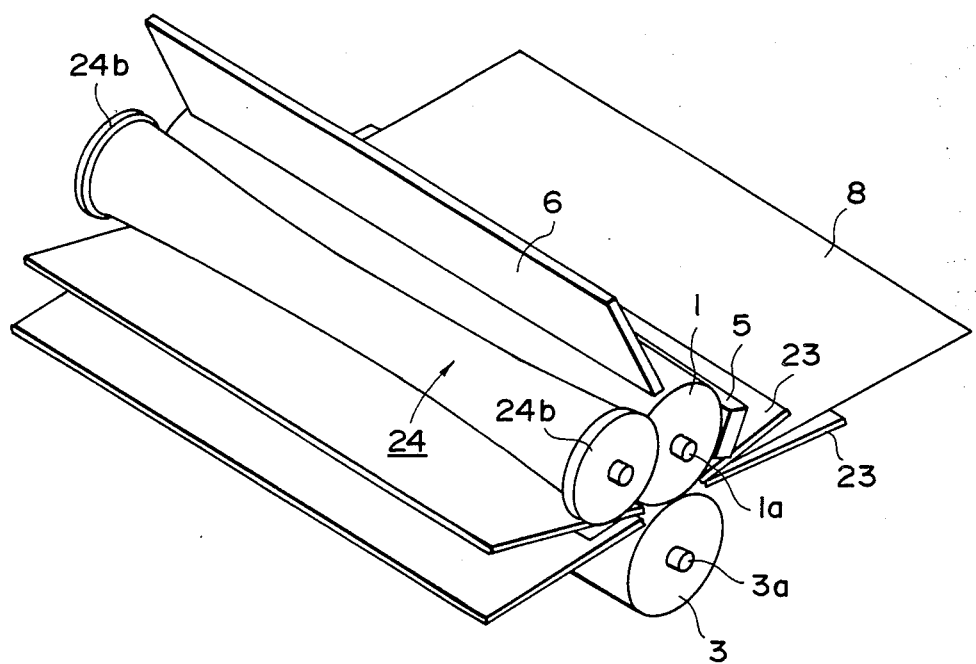
FIG. 9 is a perspective view showing the relationship between an ink roller and a pressure roller in a recording apparatus according to still another embodiment of the present invention.

As shown in FIG. 9, ink roller 1 has the same length as that of the regulating member 24. Flange members 24b are mounted at both ends of the regulating member 24. The flange member 24b has a larger diameter than that of the end portion. If the flange members 24b are designed to be in contact with the end faces of the ink rollers 1, the extension of the ink film outside the ends of the ink roller 1 can be further prevented. The flange members 24b may be mounted at both ends of the ink roller 1 to obtain the same effect as described above.

In the above embodiment, the sliding plate 6b is slid along the corresponding sliding portion 6c by an urging force of the corresponding link member 20. Even if the urging force of the link member 20 is removed, the sliding plate 6b is kept in contact with the surface of the ink roller 1. However a felt or rubber friction member may be mounted on the sliding portion 6c, and the sliding plate 20 may be slid along the friction member. In this case, the sliding plate 6b can be more accurately located in position even if the urging force of the link member 20 is removed.

Since the inverted crown-like regulating member is brought into tight contact with the surface of the transfer medium, the extension of the ink film outside the both ends of the transfer medium can be prevented, and the transfer medium can be effectively used.

Still another object of the present invention will be described with reference to FIG. 10.

This embodiment is applicable to the previous embodiments and further provides an indentation member rotatably contacting the surface of the transfer medium. Since the indentation member is bought into tight contact with the transfer medium after transfer record operation, the entire surface of the transfer medium becomes an indentation surface, and this surface is effectively smoothed by a smoothing member, thereby uniformly smoothing the entire surface of the transfer medium.

Figure 10:
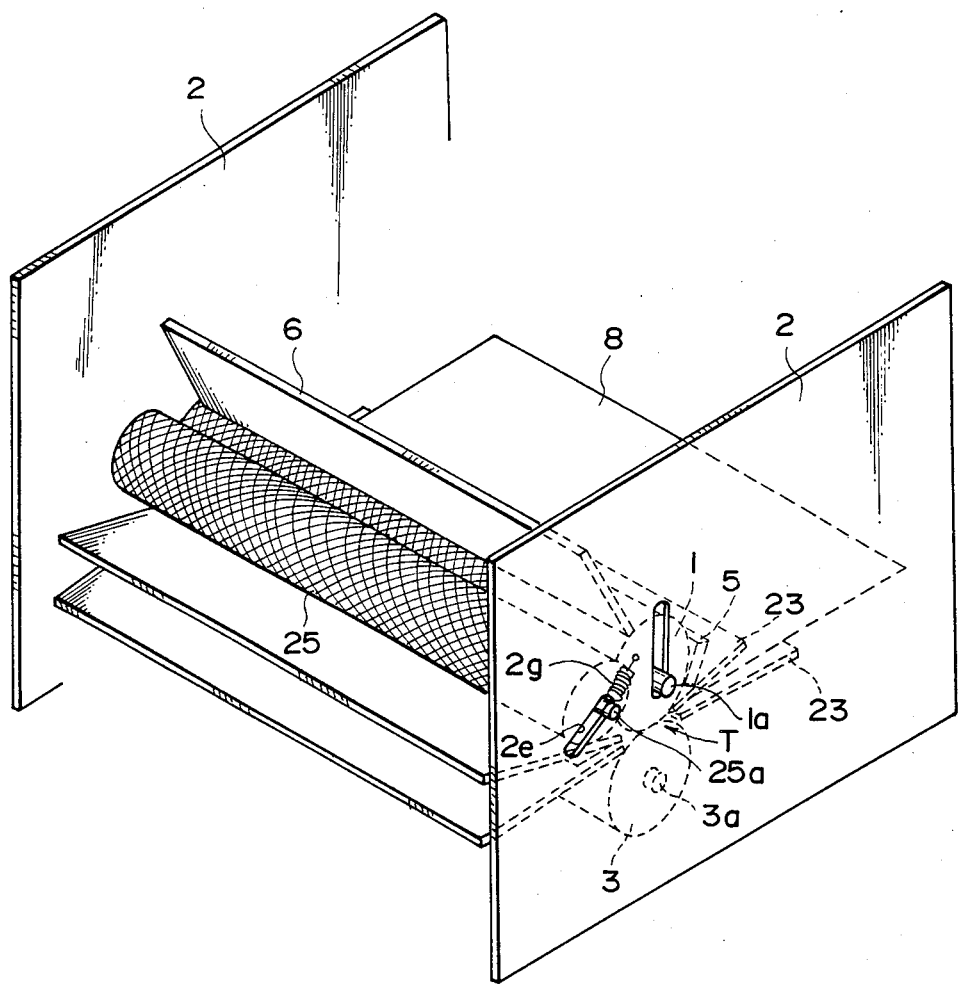
FIG. 10 is a perspective view of an identation member.

The indentation member 25 comprises an indentation roller, as shown in FIG. 10. This roller is disposed in the downstream of a transfer position T and has a mesh-like indentation surface, as shown in FIG. 10. Different meshes can be used according to different thicknesses of ink films to be transferred in record operation. If the thickness of the ink film is 2 to 6 μm, the pitch of the mesh is 2 μm or more, and its depth is 1 μm or more.

A shaft 25a extending through the indentation member 25. Both ends of the shaft 25 rotatably inserted in elongated holes 2e formed in side plates 2, respectively. The shaft 25a is biased by springs 2g toward the direction of ink roller 1. The inverted crown-like indentation member 25 is always in tight contact with the surface of the ink roller 1 and is driven upon rotation thereof. A contact force is set to be about 500 g/cm to 1 kg/cm.

In this embodiment, after the ink is transferred to the sheet, the surface of the ink roller 1 has a partial indentation surface since the ink is partially removed. The surface of the ink roller 1 is then brought into tight contact with the indentation member 25, so that the entire surface of the ink roller 1 becomes an entire indentation surface corresponding to the pattern of the mesh of the indentation member 25. Thereafter, the surface of the roller 1 is cut or smoothed with heating by a smoothing blade 6, thereby obtain a smooth surface.

In the above process, in the case of smoothing the surface of the ink roller 1 by the smoothing blade 6, if the small indentations are formed in the entire surface of the roller 1, the smoothing effect by the smoothing blade 6 can be greatly improved, and smoothing can be easily performed.

The diameter of the ink roller 1 is decreased when the record operation progresses by ink transfer and cutting of the surface by the smoothing blade 6. Since a core 1a of the ink roller 1 is slid along vertical elongated holes 2a upon a decrease in ink roller diameter, the ink roller 1 is kept in tight contact with the pressure roller 3 at a determined pressure regardless of changes in ink roller diameter.

Since the indentation member 25 is pulled by springs 2g toward the direction of the ink roller 1, the shaft 25 is slid along the elongated holes 2e upon a decrease in ink roller diameter. Therefore, the indentation member 25 is always kept in tight contact with the surface of the ink roller 1 at a determined pressure.

In the above embodiment, the surface of the indentation member 25 is constituted by a mesh-like surface to provide small indentations. However, the surface of a metal roller may be lapped to obtain small indentations to obtain the same effect as described above.

If a cleaning brush roller is disposed at a determined position to clean the surface of the indentation member 25 for every determined number of recorded sheets, the indentation surface of the member 25 does not clog with the ink or the like.

In the above embodiment, since the indentation member is brought into tight contact with the transfer medium to form small indentations on the surface of the transfer medium, the surface of the transfer medium upon transfer record operation can be easily and effectively smoothed by the smoothing member, and smoothness of the surface of the transfer member is also improved.

Still another embodiment of the present invention will be described with reference to FIGS. 11 to 14.

This embodiment provides a means for separating a record head from a transfer medium without interference and cleaning the record head. In this embodiment, if a transfer substance or the like is attached to the record head, the record head is separated from the surface of the transfer medium. In this state, the record head is cleaned by a determined cleaning means so as to remove particles attached thereto.

An apparatus in this embodiment is the one obtained by adding the cleaning means to the apparatus in FIG. 1. Only the cleaning means will be described, and the description made with reference to FIG. 1 applies to this embodiment.

Figure 11:
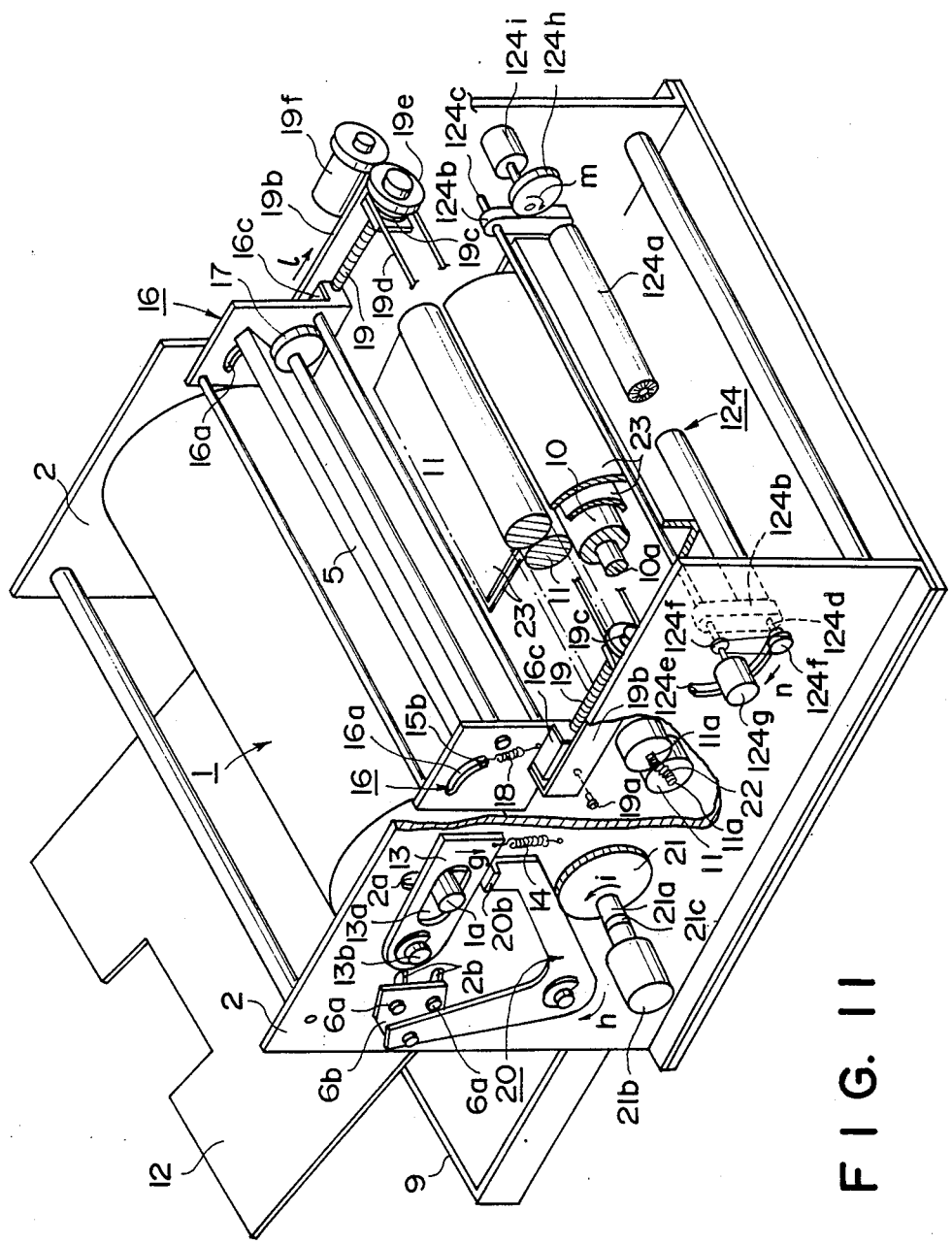
FIG. 11 is a partially cutaway perspective view of a recording apparatus according to still another embodiment of the present invention.

The arrangement of a cleaning means 124 is shown in FIG. 11. Both ends of a plastic rotaty brush 124 having substantially the same length as that of a record head 5 are rotatably supported by arms 124b. The arms 124b are pivotally mounted on a shaft 124c extending through side plates 2. An arcuate elongated hole 124e is formed in each side plate 2 such that a shaft 124d of the rotary brush 124a is pivoted about the shaft 124c through about 90°. A motor 124g is coupled through a pulley 124f to the shaft 124d of the rotary brush 124a which extends outside through the elongated hole 124e, thereby rotating the rotary brush 124a.

An eccentric cam 124h is mounted on the side plate 2 and is pivoted by a motor 124i. The eccentric cam 124h is adapted to abut against the arm 124b for supporting the rotary brush 124a.

Figure 12:
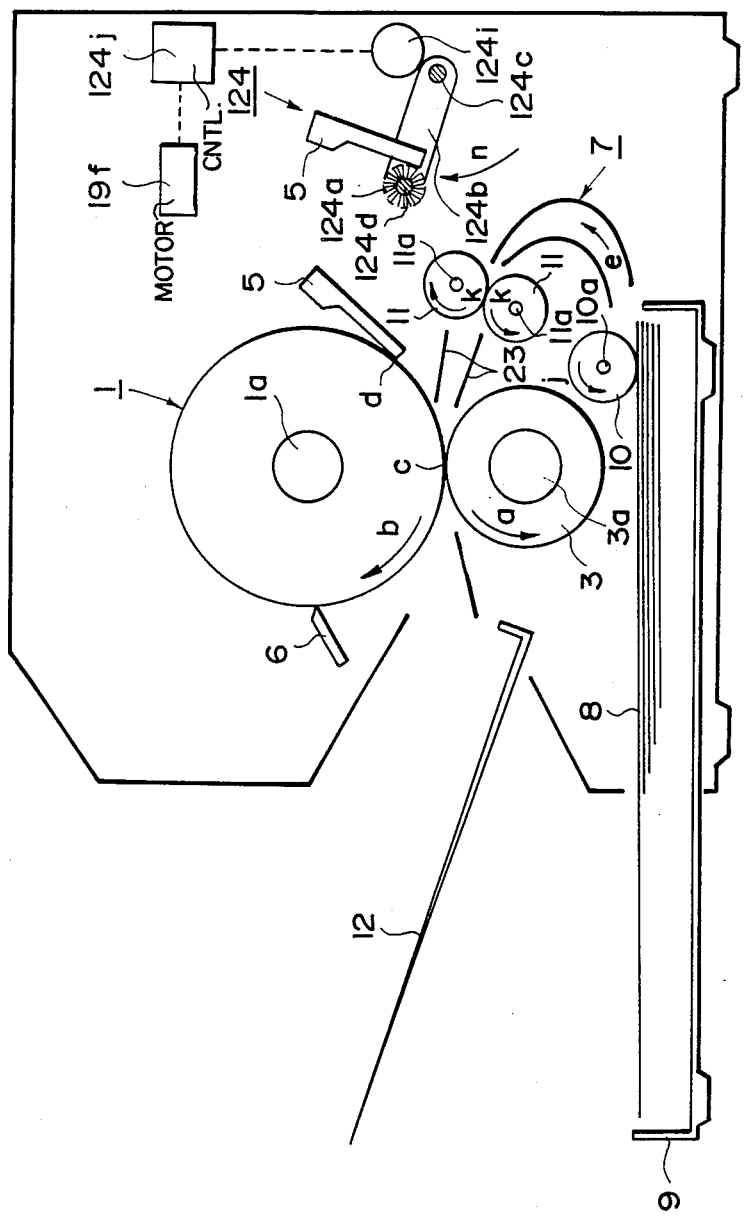
FIG. 12 is a schematic sectional view of the apparatus in FIG. 11.
Figure 13:
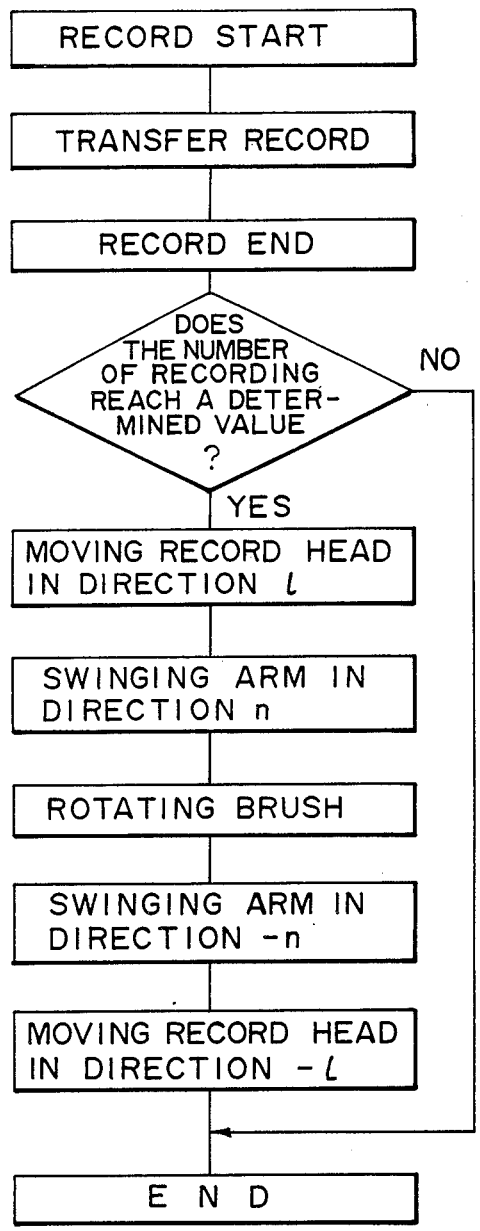
FIG. 13 is a flow chart for explaining cleaning operation of the apparatus in FIG. 11.
Figure 14:
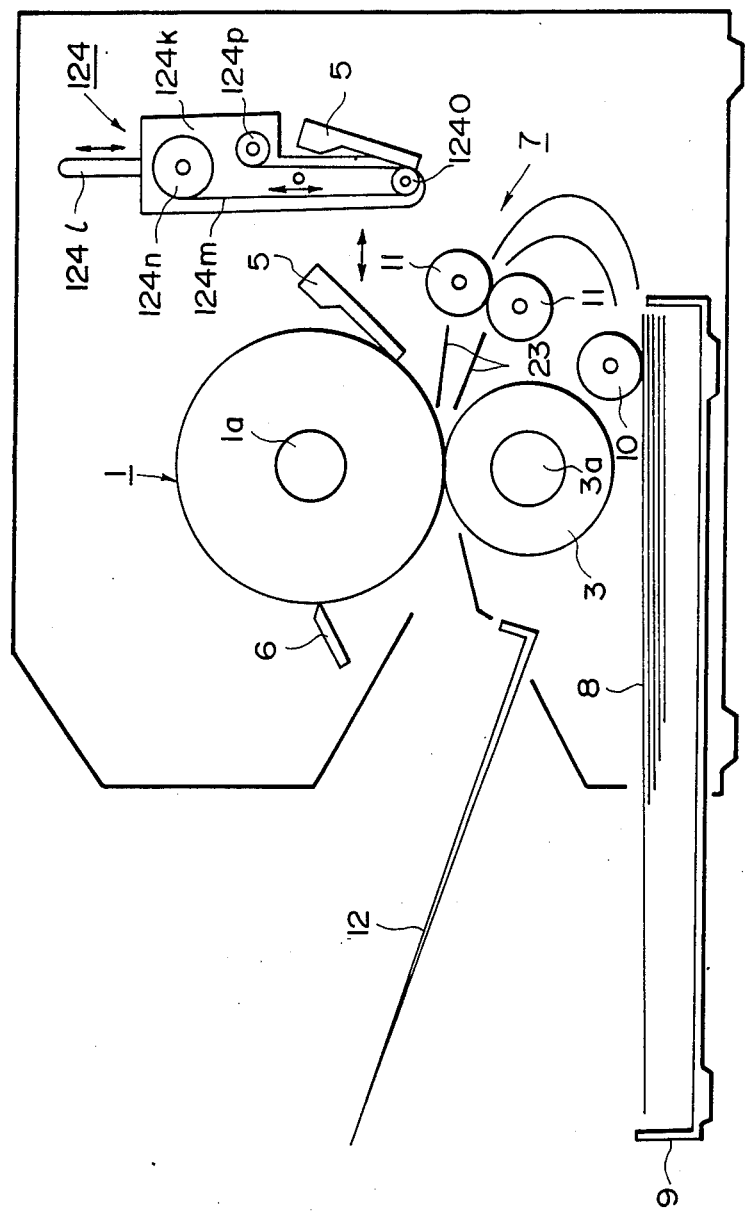
FIG. 14 is a schematic sectional view of a recording apparatus according to still another embodiment of the present invention.

The motor 124g for rotating the brush 124a, the motor 124i for rotating the eccentric cam 124h, and a motor 19f for rotating lead screw members 19 are connected to an operation controller 124j shown in FIG. 12. The operation controller 124j detects the number of recorded sheets. In response to this detection signal, the motors 124g, 124i, and 19f are driven to operate the cleaning means 124.

When the determined number of sheets are recorded, the record head 5 is cleaned by the cleaning means 124. This operation will be described with reference to a flow chart in FIG. 13. When the controller 124 detects the determined number of recorded sheets, the motor 19f is driven in response to a signal from the controller 124j, and the lead screw members 19 are rotated. Nut members 16c are slid along the lead screw members 19, and the record head 5 is slid in the direction of arrow 1 of FIG. 11 and is separated from the surface of the ink roller 1. Subsequently, the motor 124i is driven in response to a signal from the controller 124j to rotate the eccentric cam 124h in a direction of arrow m in FIG. 11. The arms 124b are rotated in a direction of arrow n in FIG. 11 to bring the rotaty brush 124a into contact with the heating portion of the record head 5. In this state, the motor 124g is driven in response to a signal from the controller 124j (CNTL) to rotate the brush 124a to clean the heating portion of the record head 5.

In the record mode, even if the melted ink or the like is attached to the heating portion of the record head 5 brought into contact with the ink roller 1 to heat it, the heating portion of the record head 5 is cleaned for every determined number of recorded sheets, and the particles attached to the heating portion can be removed. Therefore, the heat from the record head 5 heated according to the image information can be accurately conducted to the surface of the ink roller 1.

Upon completion of cleaning, the reverse sequence of operations is performed to bring the record head 5 into contact with the surface of the ink roller 1.

In the above embodiment, the cleaning means 124 is designed such that the plastic brush is rotated. However, it is essential for the cleaning means to remove the particles from the record head 5. In this sense, a fabric such as an unwoven fabric or foamed rubber in place of the plastic brush may be brought into rotational contact with the record head 5.

In the above embodiment, the brush or the like is rotated to clean the record head 5. However, in still another embodiment, an arrangement in FIG. 14 may be used in place of the cleaning means 124. A cleaning unit 124k is vertically slidable along a sliding groove 124l. A cleaning band 124m of an unwoven fabric or a felt is provided in the cleaning unit 124k and is looped from a driving roller 124n to a driving roller 124p through a driven roller 124o. The driving rollers 124n and 124p are synchronously driven by reversible motors.

With the above arrangement the record head 5 is separated, the cleaning unit 124 is descended to bring the cleaning band 124m into contact with the heating portion of the recording head 5. At the same time, the cleaning band 124m is reciprocated in directions of double-headed arrow o, thereby cleaning the record head 5.

Instead of reciprocating the cleaning band 124m, the cleaning unit 124k may be reciprocated while the cleaning band 124 is kept in contact with the record head 5.

In the above embodiment, cleaning is performed for every determined number of recorded sheets. However, cleaning may be performed for every record cycle. This can be arbitrarily achieved by modifying the program in the controller 124j. However, cleaning should not be performed during the record operation.

According to the embodiment described above, since the cleaning means can remove the particles such as a transfer substance attached to the record head, the surface of the transfer medium can be always and normally heated by the record head.

Still another embodiment of the present invention will be described with reference to FIGS. 15 to 21.

This embodiment is characterized by comprising a pressure member for bringing the record medium into tight contact with the surface of the recording medium for a determined period of time or by a determined length. Since the record medium is kept in contact with the transfer medium for the determined period of time, the transfer medium can be accurately transferred to the record medium.

A recording apparatus adopting the above means according to still another embodiment of the present invention will be described with reference to the accompanying drawings.

Figure 15:
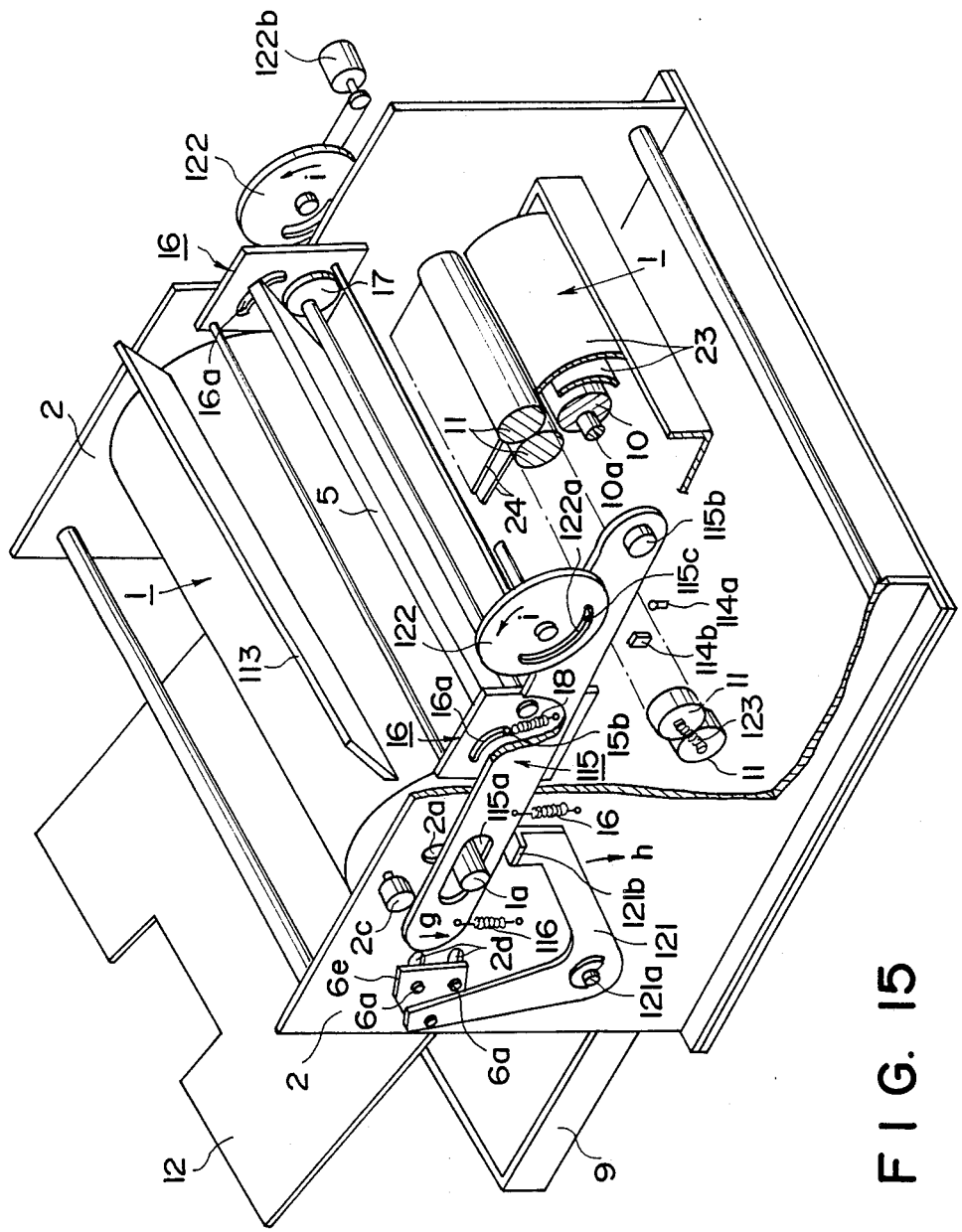
FIG. 15 is a partially cutaway perspective view of a recording apparatus according to still another embodiment of the present invention.
Figure 16:
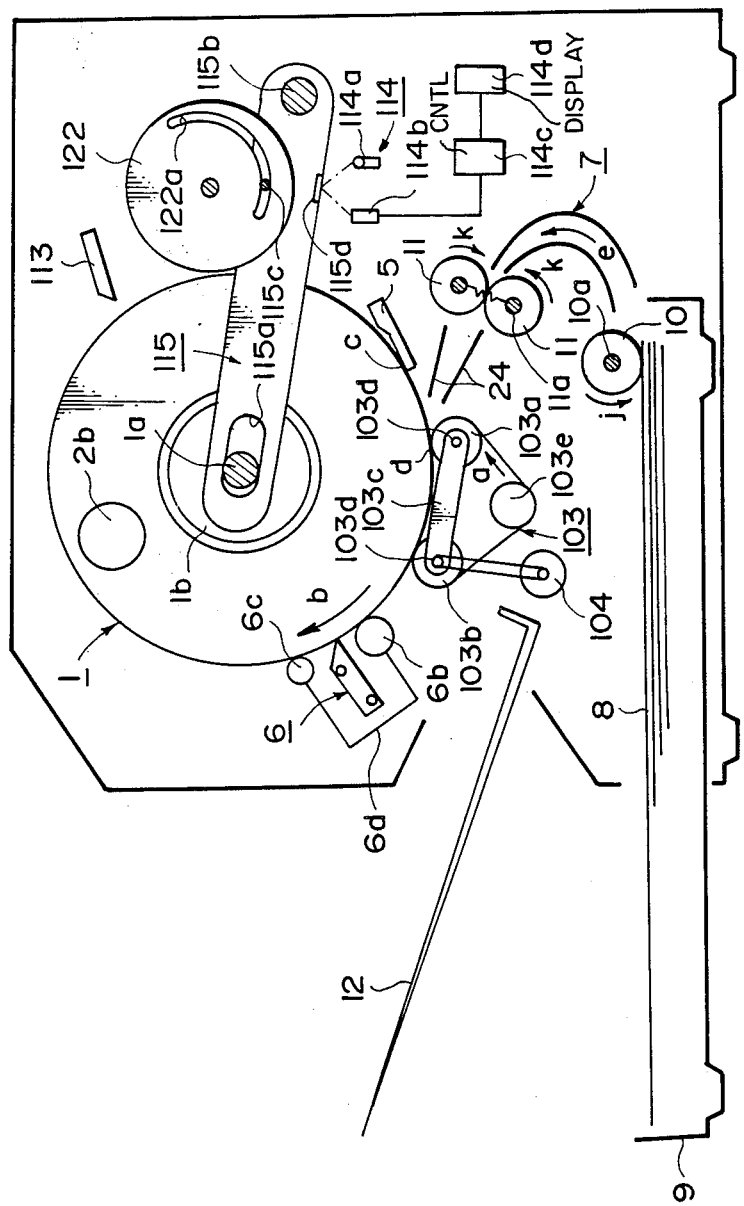
FIG. 16 is a schematic sectional view of the apparatus in FIG. 15.

FIG. 15 is a partially cutaway perspective view of the recording apparatus, and FIG. 16 is a schematic sectional view thereof.

The overall construction will be described. The recording apparatus includes an ink roller 1 serving as a transfer medium. A supercoolable ink is solidified on a core 1a in a roll-like shape to constitute the ink roller 1. The core 1a is pivotally supported by side plates 2 and mounted to be slidable downward upon a decrease in ink roller diameter.

A pressure member in tight contact with the ink roller 1 comprises a pressure belt 103. The pressure belt 103 is driven stepwise or continuously along a direction of arrow a, thereby rotating the ink roller 1 in a direction of arrow b.

A record head 5 is arranged in the upstream side of the rotational direction of the ink roller 1 with respect to the pressure belt 103. The record head 5 is heated on the basis of image information. The record head 5 is brought into line contact with the surface of the ink roller 1 along the axial direction thereof. When the diameter of the ink roller 1 is decreased, a contact portion c between the ink roller 1 and the record head 5 (to be referred to as a contact portion c for brevity hereinafter) is moved, and an arc length from the contact portion c to a pressure contact start portion d between the ink roller 1 and the pressure belt 103 (to be referred to as a pressure contact portion d for brevity hereinafter) is always kept constant.

A smoothing blade 6 is disposed at the downstream side of the rotational direction of the ink roller 1 with respect to the pressure belt 103. After the ink on the ink roller 1 is transferred to the record medium, the smoothing blade 6 heats the residual indentations on the surface of the ink roller 1 to smooth the surface thereof. The smoothing blade 6 is mounted such that the distal end of the blade 6 is in contact with the surface of the ink roller 1 and is slidable upon a decrease in the diameter of the ink roller 1.

A conveying means 7 conveys a record sheet 8 serving as the record medium in a direction of arrow e during the record operation. The conveying means 7 cooperates a feed roller 10 to convey the record sheets 8 from a cassette 9 one by one. At the same time, the conveying means 7 cooperates timing rollers 11 to convey the sheet 8 at a proper timing. The record sheet 8 conveyed by the conveying means 7 is subjected to determined record operation when it passes between the ink roller 1 and the pressure belt 103. The recorded sheet 8 is delivered outside onto a sheet tray 12.

A stationary blade 113 serving as a particle removing means is disposed above the ink roller 1 to remove the particles from the surface of the ink roller 1. A detecting means 114 is arranged at a determined position to detect the diameter of the ink roller 1 when the diameter is less than a determined diameter.

Both ends of the core 1a of the ink roller 1 are inserted in vertical elongated holes 2a formed in the right and left side plates 2 and at the same time in horizontal elongated holes 115a formed in pivot arms 115. Each pivot arm 115 is pivotal about a shaft 115b at one end thereof. The other end of the pivot arm 115 is biased by a corresponding spring 116 downward. Therefore, the ink roller 1 is always biased downward to be in tight contact with the pressure belt 103 located below the ink roller 1.

In the pressure belt 103, first and second pressure rollers 103a and 103b having substantially the same length as that of the ink roller 1 along the longitudinal direction thereof are spaced apart from each other by a determined distance and rotatably coupled by connecting plates 103c at both ends thereof. Both ends of each of shafts 103d extending through the rollers 103a and 103b are rotatably supported by the side plates 2. An idler roller 103e is located to constitute a triangle together with the pressure rollers 103a and 103b. The pressure belt 103 is looped around the pressure rollers 103a and 103b and the idler roller 103e. A driving motor 104 is coupled to the shaft 103d of the second pressure roller 103b to drive stepwise or continuously the second pressure roller 103b in the record operation. Upon operation of the motor 104, the pressure belt 103 is rotated. In this state, the ink roller 1 in tight contact with the belt 103 is driven.

Figure 17:
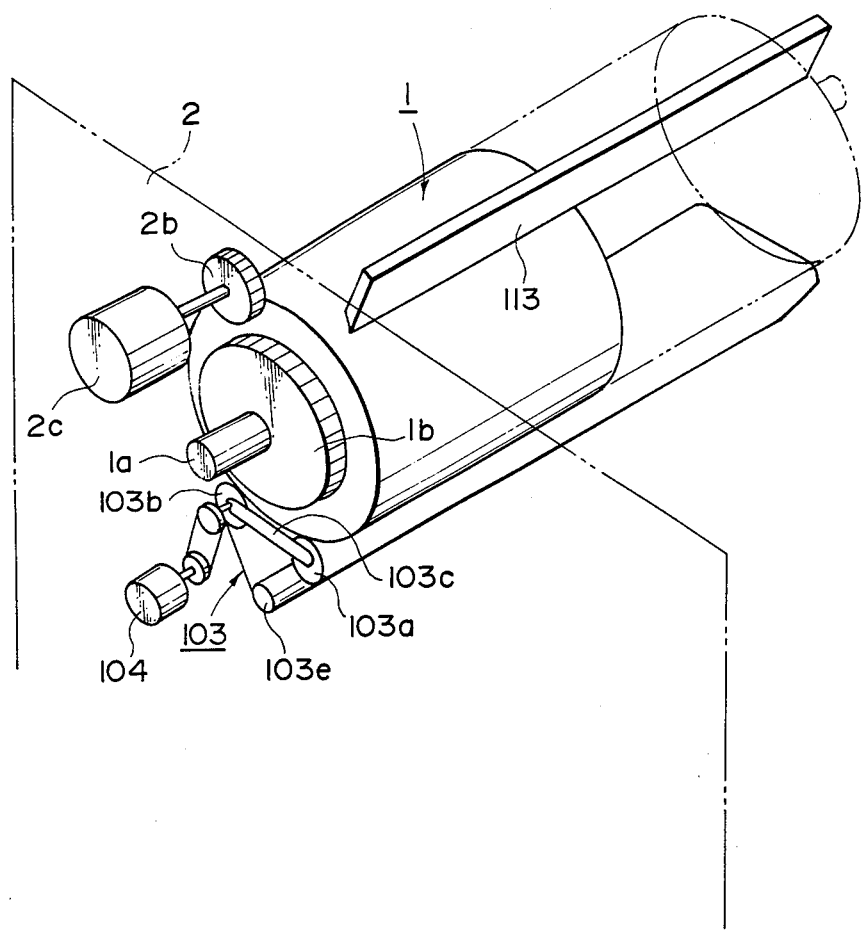
FIG. 17 is a schematic perspective view showing the relationship between an ink roller and a pressure belt in the apparatus in FIG. 15.

As shown in FIG. 17, a gear 1b is mounted at one end of the ink roller 1. A gear 2b is mounted on the corresponding side plate 2. The gear 2b mounted on the side plate 2 is located slightly above the gear 1b. When the ink roller 1 is slid upward along the vertical elongated holes 2a, the gears 1b and 2b are meshed with each other. In this state, the rotational force is transmitted from a motor 2c coupled to the gear 2b to the ink roller 1.

A stationary blade 113 is disposed above the ink roller 1. The stationary blade 113 has substantially the same length as that of the ink roller 1. Both ends of the stationary blade 113 are mounted on the side plates 2. At the same time, the stationary blade 113 comprises a knife-like member for cutting the surface of the ink roller with heating in the same manner as in the smoothing blade 6. As described above, when the ink roller 1 is slid upward, the surface of the ink roller 1 is brought into contact with the stationary blade 113.

The smoothing blade 6 is made of a metal (e.g., stainless steel, iron, or aluminum), heat-resistive hard rubber, or heat-resistive hard plastic and has substantially the same length as the ink roller 1. The smoothing blade 6 comprises a knife for heating and slightly cutting the outer surface of the ink roller 1. Sliding projections 6a extend on each end of the smoothing blade 6. The sliding projections 6a are slidably fitted in guide holes 2d formed in the side plates 2, respectively.

Front and rear rollers 6b and 6c incorporating heaters (not shown) are arranged in front of and behind the smoothing blade 6. A housing 6d is disposed in contact with the front and rear rollers 6b and 6c. The rollers 6b and 6c, and the housing 6d are integrally formed with the smoothing blade 6.

A connecting plate 6e is connected to the ends of the sliding projections 6a on each side. One end of a link member 121 is pivotally supported by the corresponding connecting plate 6e. Each link member 121 has a substantially L-shaped member and is supported on the corresponding side plate 2 and is pivotal about a link shaft 121a. The other end 121b of each link member 121 is in contact with the lower end of the corresponding pivot arm 115. When the diameter of the ink roller 1 is decreased and the pivot arms 115 are rotated in a direction of arrow g, the link members 121 are rotated in a direction of arrow h. Therefore, the smoothing blade 6 is slid along the guide holes 2d. In this case, the front and rear rollers 6b and 6c and the housing 6d are slid together with the smoothing blade 6.

A locking projection 115c (FIG. 16) extends at a determined position of each pivot arm 115 and is engaged with an eccentric hole 122a of a corresponding eccentric cam 122. The cam 122 is pivotally mounted on the corresponding side plate 2. A motor 122b is rotated in a direction of arrow i in response to a determined signal, the corresponding pivot arm 115 is rotated in the $-g$ direction.

A detecting means 114 for detecting the diameter of the ink roller 1 will be described below. The detecting means 114 comprises a light-emitting element 114a arranged below the pivot arm 115 and a light-receiving element 114b. The elements 114a and 114b are operated in the following manner. When light emitted from the light-emitting element 114a is reflected by a reflecting surface 115d (FIG. 16) formed at the lower portion of the pivot arm 115 when the diameter of the ink roller 1 is large. In this case, the reflected light is received by the light-receiving element 114b. However, when the roller diameter is decreased and the pivot arm 115 is rotated in the direction of arrow g, the light from the light-emitting element 114a is not received by the light-receiving element 114b. When the ink roller diameter is less than a determined diameter, the light from the light-emitting element 114a is not received by the light-receiving element 114b at all, thereby detecting the determined diameter of the ink roller 1.

The light-receiving element 114b is connected to a controller 114c (CNTL). When the controller 114c receives a determined signal from the light-receiving element 114b, record operation is stopped, and determined display is performed on a display unit 114d.

The arrangement of the sheet conveying means 7 is shown in FIGS. 15 and 16. The feed roller 10 and the timing rollers 11 have a length larger than the width of the record sheet 8. Shafts 10a and 11a extend through the rollers 10 and 11, and both ends of each of the shafts 10a and 11a are rotatably supported by the side plates 2. The shafts 10a and 11a are rotatably coupled to the motor 104 for rotating the pressure belt 103.

The operation of the recording apparatus having the construction described above will be described below.

The record head 5 is brought into contact with the surface of the ink roller 1 to initiate record operation, the pressure belt 103 is rotated by the motor 104 in the direction of arrow a, and the ink roller 1 is rotated in the direction of arrow b. At the same time, the record head 5 is heated according to image information, and the ink on the surface of the ink roller 1 is heated and melted in the image pattern. The ink is kept melted and reaches the pressure contact portion d upon rotation of the ink roller 1. Simultaneously, the feed roller 10 and the timing rollers 11 are respectively rotated in the directions of arrows j and k to pick up each record sheet 8 from the cassette 9. The sheet is then conveyed in the pressure contact portion d at a proper record timing.

The ink melted on the surface of the ink roller 1 is transferred to the record sheet 8 conveyed in the pressure contact portion d. In this case, the record sheet 8 is conveyed from the first pressure roller 103a to the second pressure roller 103b while the sheet 8 is kept in tight contact with the ink roller 1. The ink transferred onto the record sheet 8 is solidified since its temperature is decreased during the tight contact operation, and the ink is firmly adhered to the record sheet 8. Therefore, when the record sheet 8 is separated from the surface of the ink roller 1, a determined image is accurately transferred onto the record sheet 8. Therefore, the record sheet 8 delivered outside onto the sheet tray 12 is free from any blank areas caused by poor transfer.

The small indentations are left on the surface of the ink roller after the ink transfer. When the ink roller 1 is rotated and reaches the smoothing blade 6, the surface of the roller 1 is heated and melted by the blade 6 to eliminated the indentations, thereby obtaining a smooth surface. This smoothing effect can be further improved upon heating of the front and rear rollers 6b and 6c.

The diameter of the ink roller 1 is decreased when record operation progresses by the ink transfer and melting by the smoothing blade 6. However, since the core 1a of the ink roller 1 is slid along the vertical elongated holes 2a, and the ink roller 1 and the pressure belt 103 are always kept in contact with each other at a determined pressure regardless of changes in ink roller diameter. Upon sliding of the core 1a, the pivot arms 115 are rotated in the direction of arrow g. Each link member 121, one end 121b of which is in contact with the lower end of the corresponding pivot arm 115, is rotated in the direction of arrow h. The sliding projections 6a on the smoothing blade 6 are slid along the guide holes 2d toward the direction of the ink roller 1. Therefore, the smoothing blade 6 is kept in contact with the surface of the ink roller 1.

Even if the ink roller diameter is changed, the arc length from the contact portion c to the pressure contact portion d must be kept unchanged. The description of the movement of the record head 5 will refer back to earlier discussed FIGS. 4A and 4B since the movement remains the same. Since the record head 5 is biased by the eccentric cams 17 in the direction of arrow f, the guide projections 15b on the support 15 are respectively slid along arcuate elongated holes 16a while support projections 16b on the support side plates 16 serve as pivot positions. Therefore, the angle between the ink roller 1 and the record head 5 and the arc length from the contact portion c to the pressure contact portion d are kept unchanged.

Figure 18:
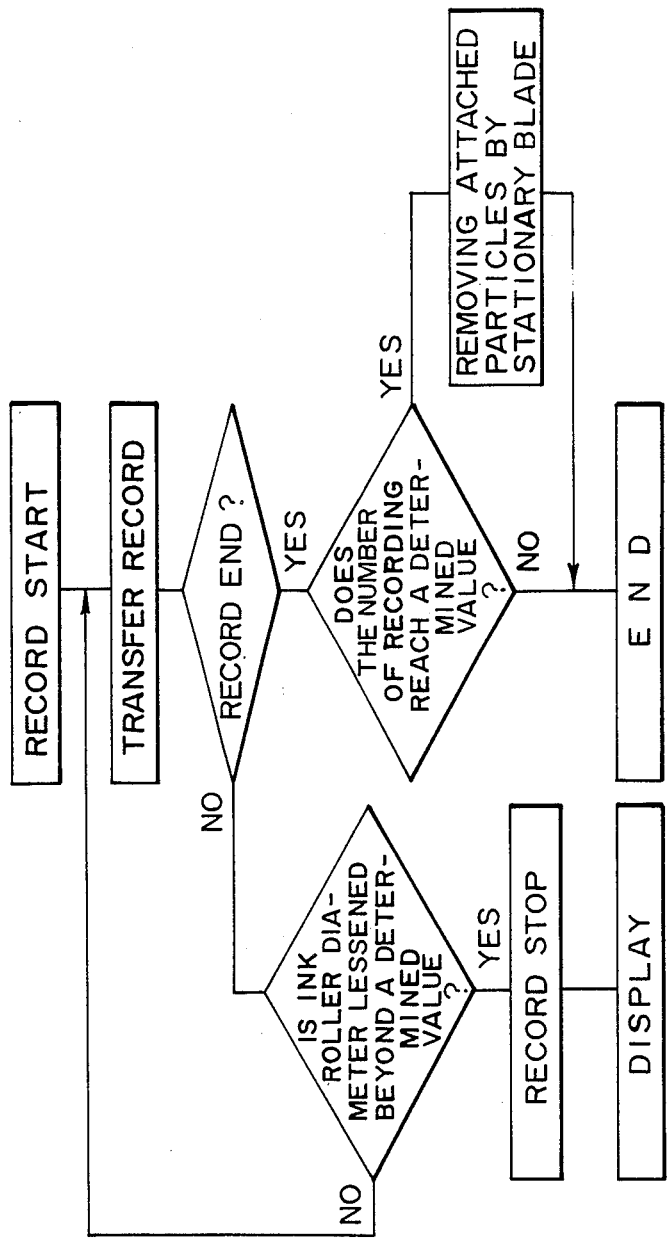
FIG. 18 is a flow chart for explaining removal of particles attached to the surface of the ink roller and detection of the ink roller diameter.

Removal of particles from the surface of the ink roller 1 and detection of the diameter of the roller 1 will be described with reference to a flow chart in FIG. 18.

Figure 19:
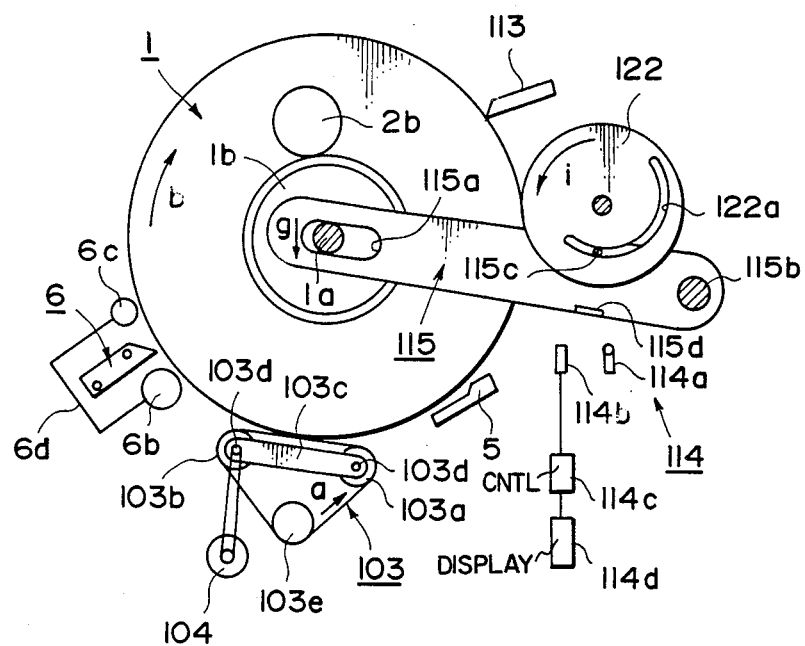
FIG. 19 is a sectional view for explaining removal of particles from the surface of the ink roller.

In the case of removing small dust particles such as paper dust particles from the surface of the ink roller, the motor 122b is rotated in the direction of arrow i and then the cams 122 are rotated in the direction of arrow i. At the same time, the pivot arms 115 are rotated about the shaft 115b in the −g direction, the ink roller 1 is slid upward. As shown in FIG. 19, the contact between the ink roller and the pressure belt 103 is released. At the same time, the gear 1b of the ink roller 1 is meshed with the gear 2b mounted on the side plate 2. In this case, the surface of the ink roller 1 is in contact with the stationary blade 113. When the motor 2c is driven, the ink roller 1 is rotated, and its surface is slightly cut by the stationary blade 113. The particles attached to the surface of the ink roller 1 are removed by this cutting. The circularity of the ink roller 1 can be maintained. In the recording apparatus of this embodiment, even if the particles are attached to the surface of the ink roller 1, they can be easily removed, thereby preventing degradation of the recorded image.

The cleaning operation for removing the particles is desirably automatically performed for every determined number of recorded sheets. A detector (not shown) for detecting the number of recorded sheets is connected to a controller (not shown) for controlling driving of the motor 122b for rotating the cams 122 and the motor 2c for rotating the gear 2b. A detection signal from the detector is transmitted to the controller to cause the stationary blade 113 to automatically remove the particles from the surface of the ink roller 1 for every determined number of recorded sheets.

Figure 20A:
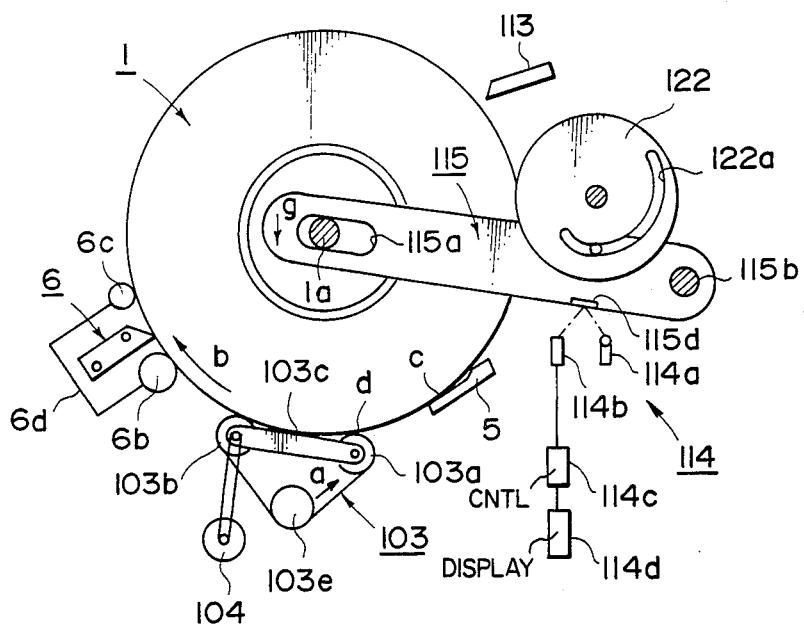
FIGS. 20A and 20B are respectively sectional views for explaining detection of the ink roller diameter.
Figure 20B:
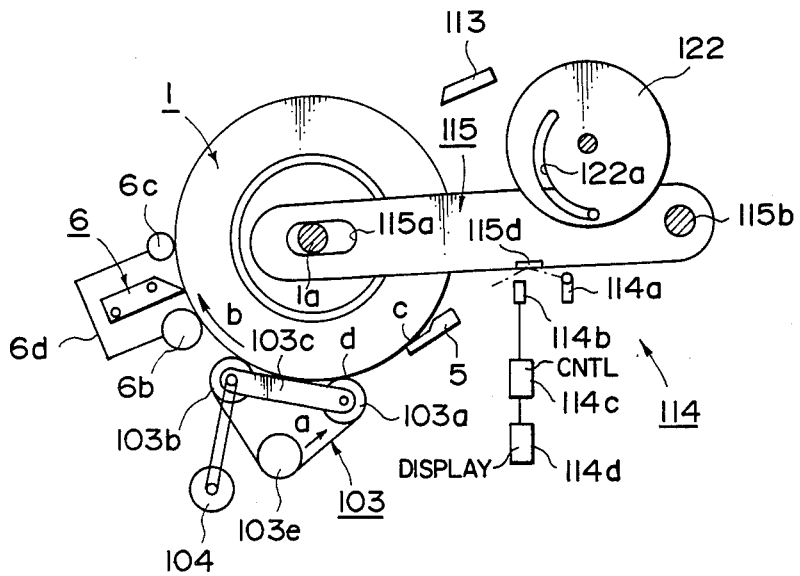

The diameter of the ink roller is gradually decreased when the subsequent record cycles continue. Along with the progress of the record operation, the pivot arms 115 are rotated in the direction of arrow g. In this case, as shown in FIG. 20A, if the diameter of the ink roller 1 is larger than a determined value, light emitted from the light-emitting element 114a is reflected by the reflecting surface 115d of the pivot arm 115 and is received by the light-receiving element 114b. However, as shown in FIG. 20B, when the diameter of the ink roller 1 is smaller than the determined value, the light from the light-emitting element 114a is not received by the light-receiving element 114b. In this case, the controller 114c (CNTL.) is operated in response to the light-receiving element 114b to interrupt the record operation. At the same time, the fact that the current diameter of the ink roller 1 is smaller than the determined value is displayed in the display unit 114d. Therefore, the operator can know the proper timing for replacement of the ink roller. At the same time, he can replace the old ink roller 1 with a new one without damaging the record head 5 and the smoothing blade 6.

The record sheet 8 conveyed by the pressure belt 103 is kept in contact with the ink roller 1 between the first pressure roller 103a and the second pressure roller 103b. However, the distance between the first and second pressure rollers 103a and 103b may be manually or automatically adjusted. The time for which the record sheet 8 is kept in contact with the ink roller 1 can be arbitrarily set. Even if the distance between the first and second pressure rollers 103a and 103b is kept constant, the time for which the record sheet 8 is kept in contact with the ink roller 1 can be adjusted by adjusting the rotational speed of the pressure belt 103. That is, the time for which the record sheet 8 is kept in contact with the ink roller 1 can be varied by means of the pressure member.

It should be noted that the time for which the record sheet 8 is kept in contact with the ink roller 1 preferably falls within the range of 0.1 to 1.0 second.

Even if the pressure belt 103 is not used as the pressure member, an arrangement in FIG. 21 may be employed. A smoothing pressure member 103f made of Teflon or coated with Teflon is kept in contact with the surface of the ink roller 1 between first and second pressure portions 103g to 103h, and the ink roller 1 is rotated in synchronism with the record operation. The record sheet 8 can be conveyed upon rotation of the ink roller. At the same time, the record sheet 8 is kept in contact with the ink roller 1 by means of the smoothing pressure member 103f between the first and second pressure portions 103g and 103h, thereby obtaining the same effect as in the above embodiment.

In the above embodiment, the stationary blade 113 comprises a knife member, but is not limited thereto. The shape of the stationary blade 113 is not limited to any specific one only if the particles can be removed from the surface of the ink roller 1.

In the above embodiment, determined transfer is performed for the record medium, the record medium can be kept in contact with the transfer medium for a determined period of time or by a determined length, thereby guaranteeing the transfer, and the image is free from blank areas caused by poor transfer.

Still another embodiment of the present invention will be described with reference to FIGS. 22 to 24.

In this embodiment, a plurality of transfer media having an identical color are rotatably mounted on a holding member. When one transfer medium is used up, the holding member is rotated to allow use of the next transfer medium.

A recording apparatus using the above means according to still another embodiment of the present invention will be described with reference to the accompanying drawings.

Figure 22:
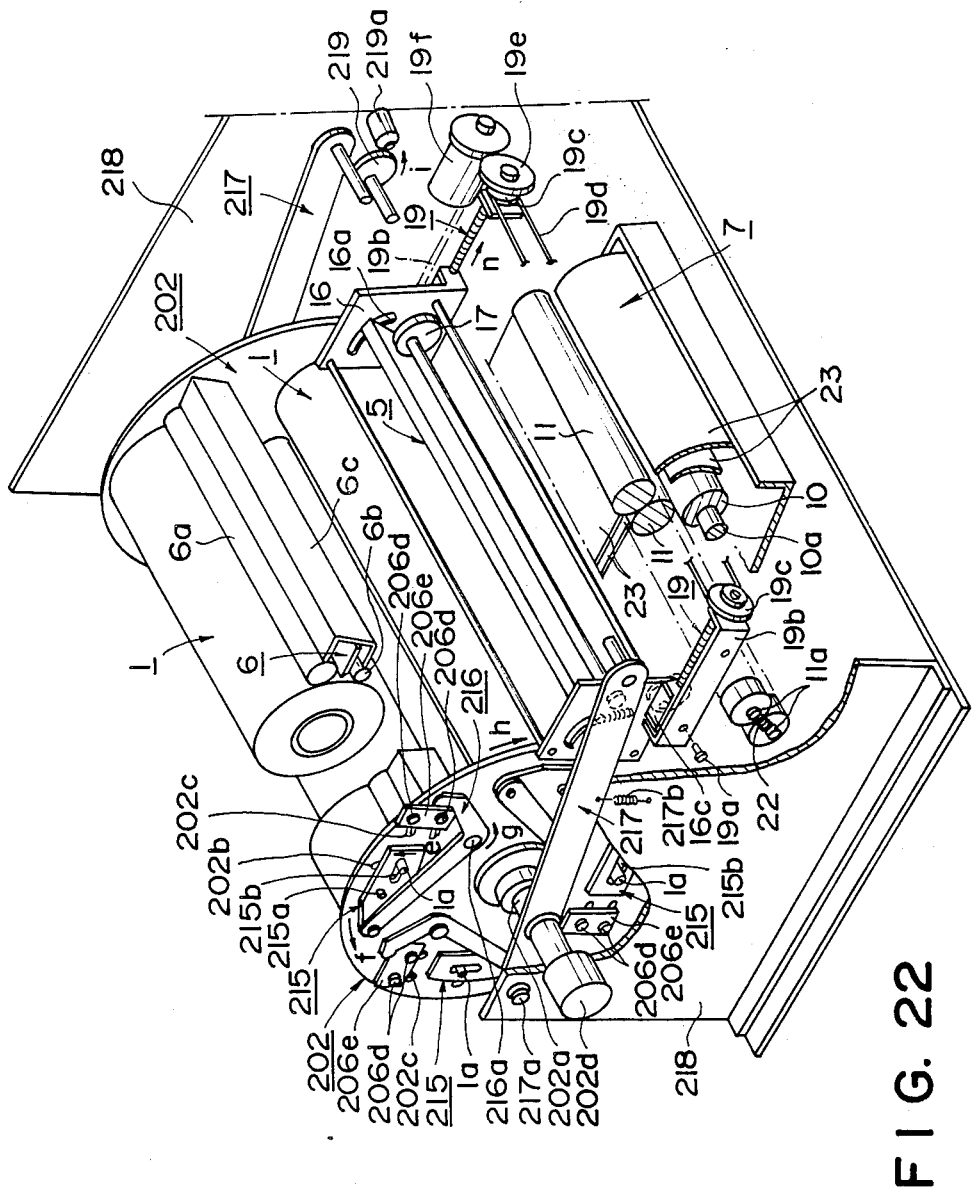
FIG. 22 is a partially cutaway perspective view of a recording apparatus according to still another embodiment of the present invention.
Figure 23:
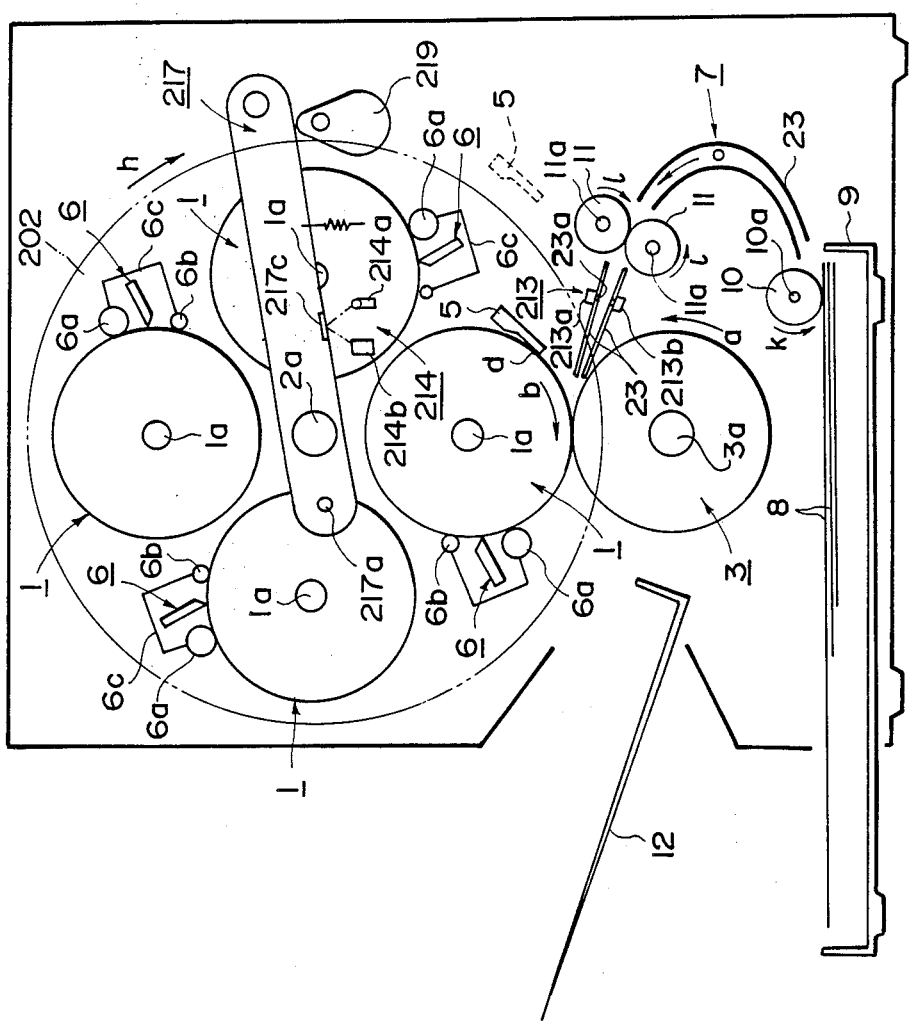
FIG. 23 is a schematic sectional view of the apparatus in FIG. 22.
Figure 24:
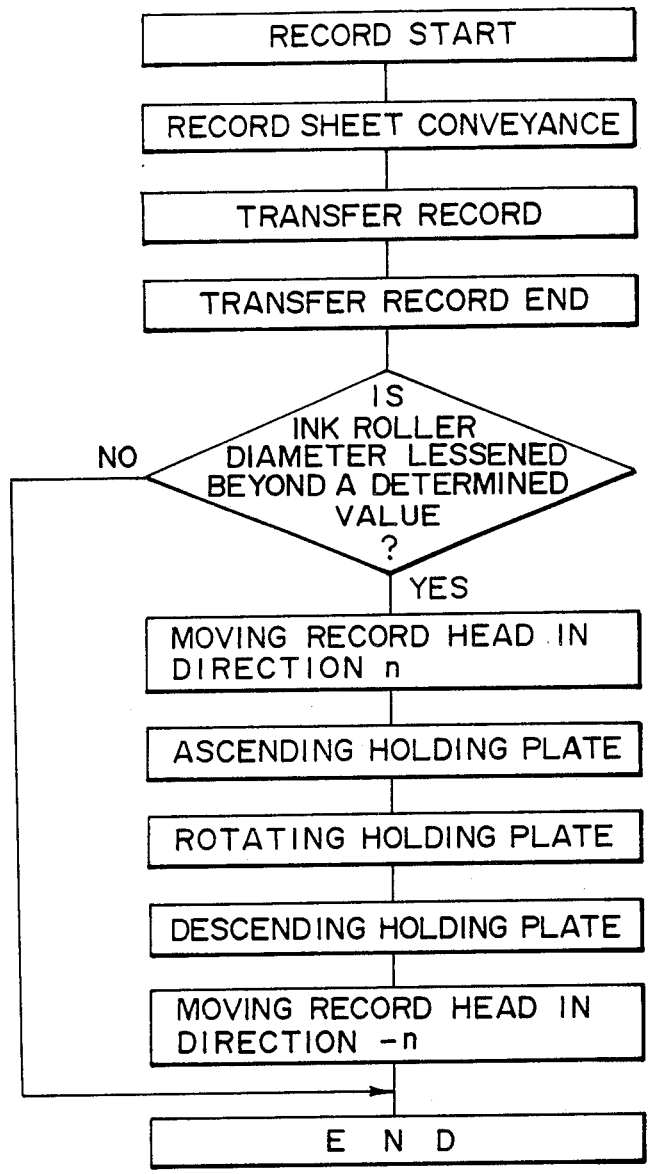
FIG. 24 is a flow chart for explaining of record operation in the apparatus in FIG. 22.

FIG. 22 is a partially cutaway perspective view of the recording apparatus, and FIG. 23 is a schematic sectional view thereof.

The overall construction of the recording apparatus will be described below. The apparatus includes four ink rollers 1 as transfer media. A supercoolable ink is solidified on cores 1a in a roll-like shape to constitute the four ink rollers 1. Both ends of each core 1a are rotatably inserted in elongated holes 202b formed in right and left holding plates 202.

A pressure member adapted to be brought into tight contact with one of the ink rollers 1 comprises a pressure roller 3. The pressure roller 3 is rotated by a driving motor in a direction of arrow a to rotate the corresponding ink roller 1 in a direction of arrow b.

A record head 5 is disposed in the upstream side of the rotational direction of the ink roller 1 with respect to a pressure contact portion c between the pressure roller 3 and the ink roller 1 (to be referred to as a pressure contact portion c for brevity hereinafter). The record head 5 is brought into line contact with the surface of the ink roller 1 along the axial direction thereof. When the diameter of the ink roller 1 is decreased, a contact portion d between the ink roller 1 and the record head 5 (to be referred to as a contact portion d for brevity hereinafter) is moved upward, so that the arc length between the contact portion d and the pressure contact portion c is kept unchanged.

Four smoothing blades 6 as smoothing means are mounted on the holding plates 202. The four smoothing blades 6 are respectively brought into contact with the four ink rollers 1 to heat and smooth small indentations left on the surfaces of the ink rollers 1 after the ink is transferred to the record medium. The smoothing blades 6 are designed to be slid upon a decrease in diameter of the ink A conveying means 7 conveys a record sheet 8 in a direction of arrow o in synchronism with the record operation. The conveying means 7 cooperates with a feed roller 10 to pickup the record sheets 8 from a cassette 9 one by one. The conveying means 7 also cooperates with timing rollers 11 to convey each record sheet 8 at a proper timing. The record sheet 8 conveyed by the conveying means 7 is subjected to determined record operation when it passes between the ink roller 1 and the pressure roller 3. The recorded sheet is delivered outside onto a sheet tray 12.

A sheet detecting means 213 is arranged in a conveyance path of the record sheet 8. A diameter detecting means 214 is arranged at a determined position to detect the diameter of the ink roller 1.

The components of the recording apparatus will be described in detail.

The ink rollers 1 will be first described. One of the ink rollers 1 is used for transfer record. The remaining three rollers 1 are reserved as supplementary rollers. The four ink rollers 1 have a supercoolable ink of an identical color.

Both ends of the cores 1a of the ink rollers 1 are mounted on the right and left holding plates 202 at equal angular intervals. Four radial elongated holes 202b are formed in each disk-like holding plate 202 in the peripheral portion at equal angular intervals with respect to a central shaft 202a. The cores 1a of the ink rollers 1 are respectively inserted in the elongated holes 202b. Pivot plates 215 are mounted on the holding plates 202 and are pivoted about shafts 215a. Each elongated hole 215b crossing the corresponding elongated hole 202b is formed at one end of each pivot plate 215. The cores 1a are inserted in the elongated holes 215b, respectively. When the diameter of the ink roller 1 is decreased and the cores 1a are slid along the elongated holes 202b toward a direction of arrow e of the central axis, the pivot plates 215 are rotated in a direction of arrow f.

One end of a link member 216 is rotatably supported by the other end of the corresponding pivot plate 215. Each link member 216 comprises a substantially L-shaped member. The link member 216 is pivotally supported by the holding plate 202 about its bent portion. When the pivot plate 215 is rotated in the direction of arrow f, the corresponding link member 216 is rotated in a direction of arrow g.

Each smoothing blade 6 comprises a knife member. This member is made of a metal (e.g., stainless steel, iron, or aluminum), heat-sensitive hard rubber, or heat-sensitive hard plastic and has substantially the same length as that ot the ink roller 1. Front and rear rollers 6a and 6b incorporating heaters (not shown) are disposed to interpose the corresponding smoothing blade 6 so as to heat the surface of the corresponding ink roller 1. A housing 6c is integrally formed to surround the corresponding smoothing blade between the front and rear rollers 6a and 6b. Shafts 6d extend through the front and rear rollers 6a and 6b, and both ends of the shafts 6d are inserted in guide holes 202c formed in the holding plates 202. A connecting plate 206e is mounted on the end of each shaft 206d. The other end of each link member 216 abuts against the corresponding connecting plate 206e. When the diameter of the ink roller is decreased and the corresponding link members 216 are rotated in the direction of arrow g, the connecting plates 206e connected to this link members 216 are slid along the guide holes 202c in the direction toward the ink roller 1. Therefore, the corresponding smoothing blade 6 is always kept in contact with the surface of the ink roller 1. The holding plates 202 mounted with the ink rollers 1 and the smoothing blades 6 are pivotally supported about central shaft 202a through the arms 217. A motor 202d connected to the central shaft 202a is driven in response to a determined signal so that the holding plates 202 are rotated stepwise in a direction of arrow h.

One end of each arm 217 is supported by a corresponding side plate 218 and is pivotal about a shaft 217a. The arm 217 is biased downward by a spring 217b hooked between the arm 217 and the side plate 218. Therefore, one of the four ink rollers 1 is brought into tight contact with the pressure roller 3 located below the holding plates 202. An eccentric cam 219 is pivotally mounted at a determined position of each side plate 218. The eccentric cam 219 is abuts against the other end of the corresponding arm 217. A motor 219a is coupled to the eccentric cam 219. Upon driving of the motor 219a, when the eccentric cams 219 are rotated in a direction of arrow i, the arms 217 are rotated upward about the shaft 217a, and the holding plates 202 are ascended, thereby releasing the contact between tne currently used ink roller 1 and the pressure roller 3.

Both ends of a shaft 3a extending through the pressure roller 3 are rotatably supported by the side plates 218, and the roller 3 is rotated in the direction of arrow a upon driving of a corresponding motor in the same manner as in the previous embodiments.

A sheet detecting means 213 is arranged at a determined position in a sheet conveyance path constituted by sheet guides 23. The detecting means 213 will be described below. As shown in FIG. 23, detection windows 23a are formed at opposite positions in the sheet guides 23 located between the timing rollers 11 and the pressure roller 3 so as to interpose the sheet conveyance path therebetween. A light-emitting element 213a is arranged at one window 23a, and a light-receiving element 213b is arranged at the other window 23a. Light from the light-emitting element 213a is adapted to be received by the light-receiving element 213b. The light-receiving element 213b is connected to a controller for controlling record operation in response to a signal from the light-receiving element 213b. If the detecting means 213 does not detect the record sheet 8 even if the record sheet 8 is conveyed by the feed roller 10 and the timing rollers 11, record operation is interrupted.

The ink roller diameter detecting means 214 will be described below. As shown in FIG. 23, the detecting means 214 comprises a light-emitting element 214a and a light-receiving element 214b, both of which are located below the arms 217. When the diameter of the ink roller 1 kept in contact with the pressure roller 3 is larger than a determined value, light emitted from the light-emitting element 214a is reflected by a reflecting surface 217c formed at the lower portion of the arm 217 and is received by the light-receiving element 214b. However, if the ink roller diameter is decreased and the arms 217 are rotated downward, light cannot hardly be received by the element 214b. If the ink roller diameter is smaller than the determined value, the light reflected by the reflecting surface 217c is not received by the light-receiving element 214b. When the light-receiving element 214b cannot receive light any longer, the element 214b generates a determined signal. The controller is operated to replace the ink roller 1 kept in contact with the pressure roller 3 with a new roller in response to the determined signal from the light-receiving element 214b.

Transfer record operation in the recording apparatus having the construction described above will be described with reference to a flow chart in FIG. 24.

One of the four ink rollers 1 brought into tight contact with the pressure roller 3. At the same time, the record head 5 is brought into contact with the roller 1 to start record operation. In this state, the feed roller 10 and the timing rollers 11 are respectively rotated in directions of arrows k and l, and the record sheets 8 are picked up from the cassette 9 one by one. The picked sheet is conveyed in a pressure contact portion c. In synchronism with this operation, the pressure roller 3 is rotated in the direction of arrow a, and the ink roller 1 kept in tight contact with the pressure roller 3 is driven in the direction of arrow b. Upon rotation of the pressure roller 3, the record head 5 is heated on the basis of image information. The ink on the surface of the ink roller 1 is heated and melted. The melted ink then reaches the pressure contact portion c upon rotation of the ink roller 1. The melted ink is transferred onto the conveyed record sheet 1. The recorded sheet 8 is delivered outside onto the sheet tray 12.

When the record operation is completed as described above, the diameter detecting means 214 for the ink roller 1 detects whether or not the diameter of the ink roller 1 is smaller than the determined value. If so, the motor 19f is driven in response to a determined signal to rotate lead screw members 19. The record head 5 is guided by the lead screw members 19 and retracted in a direction of arrow n of FIG. 22. After the record head 5 is retracted, the motor 219a is driven to rotate the eccentric cams 219 in the direction of arrow i, and the arms 217 are rotated upward about the shaft 217a, thereby ascending the holding plates 202. Therefore, the contact between the consumed ink roller 1 and the pressure roller 3 is released.

When the contact is released as described above, the motor 202d is driven to rotate the holding plates 202 through 90° in the direction of arrow h. A new ink roller 1 then opposes the pressure roller 3. In the reverse sequence of operation, the holding plates 202 are descended and the new ink roller 1 is brought into tight contact with the pressure roller 3. The record head 5 is slid in the −n direction and is brought into contact with the ink roller 1. In this state, the next transfer record cycle can be started.

If the record sheet 8 is not detected by the detecting means 213 even if the feed roller 10 and the timing rollers 11 are rotated by a determined number of times, record operation is interrupted.

More specifically, when the record sheet 8 is conveyed by the timing rollers 11 by a determined number of lines, light from the light-emitting element 213a is shielded by the conveyed record sheet and is not received by the light-receiving element 213b any longer. However, if the record sheet 8 is absent or subjected to jam, the light from the light-emitting element 213a is not shielded by the sheet 8 even if the timing rollers 11 convey the sheet 8 by the determined number of lines. In other words, light from the light-emitting element 213a is kept received by the light-receiving element 213b. In this manner, the presence/absence of the record sheet 8 can be detected. If the sheet 8 is not detected, the record operation is interupted.

If record operation continuous even if the record sheet 8 is not conveyed, the ink melted by the record head 5 contaminates directly the surface of the pressure roller 3. In the subsequent record cycles, the lower surfaces of the record sheets 8 are contaminated. However, in this embodiment, the behavior of the detecting means 213 prevents such inconvenience.

It should be noted that instead of stopping the record operation when the record sneet 8 is not detected by the detecting means 213, tne contact between the ink roller 1 and the pressure roller 3 may be released upon rotation of the cams 319 in the direction of arrow i. In either case, contamination of the lower surface of the record sheet can be prevented.

In this embodiment, in addition to the ink roller 1 actually used in transfer record operation, three additional rollers are prepared. However, the number of supplementary rollers is not limited to three, but may be changed as needed. Even if the used ink roller 1 is replaced with a new ink roller, detection by the diameter detecting means 214 need not be performed. In this case, the used roller is manually replaced with a new one.

The pressure roller 3, the feed roller 10, and the timing rollers 11 need not be constituted by roller-like members, but may comprise rotary belts to obtain the same effect as in the above embodiment.

In the above embodiment, the transfer medium comprises an ink roller, but may comprise a member obtained by coating the supercoolable ink on a rotary drum or the like.

In the above embodiment, a plurality of transfer media having an identical color are used, and all the media except one serve as the supplementary rollers. Therefore, even if the transfer medium is used up, it can be easily replaced with a supplementary transfer medium.

Still another embodiment of the present invention will be described with reference to FIGS. 25 to 28. This embodiment exemplifies the case wherein the colors of the ink rollers 1 in the recording apparatus of FIGS. 22 and 23 are different. The arrangement of the apparatus in the embodiment of FIGS. 25 to 28 is the same as that of FIGS. 22 and 23.

In this embodiment, the recording apparatus includes holding members adapted to be rotated stepwise, a plurality of transfer media rotatably mounted on the holding members and having different colors, a record head for heating the surface of each transfer medium on the basis of image information, a pressure member for rotating the transfer medium in synchronism with record operation and bringing the record medium into contact with the surface of the transfer medium, and a conveying means for conveying the record medium in synchronism with the record operation. According to this embodiment, the holding members mounted with the transfer media are rotated stepwise on the basis of image information to sequentially bring the transfer media into contact with the record medium, thereby performing a multicolor transfer record operation.

Most of the components of the recording apparatus in this embodiment are same as those of FIGS. 22 and 23, and only the main part and the additional arrangements will be described.

Ink rollers 1 will be first described. The four supercoolable ink rollers 1 comprise a yellow roller Y, a magenta roller M, a cyan roller C, and a black roller Bk. The supercoolable ink is defined as follows. When the ink is heated, melted or softened, and then cooled below the melting or softening point, the ink maintains the melting or softening state for allowing transfer of the ink onto the record sheet. The supercoolable ink is prepared such that one, or two or more dyes and pigments (e.g., carbon black) used in printing or any other record process are mixed in a supercoolable heat-fusible binder.

Figure 25:
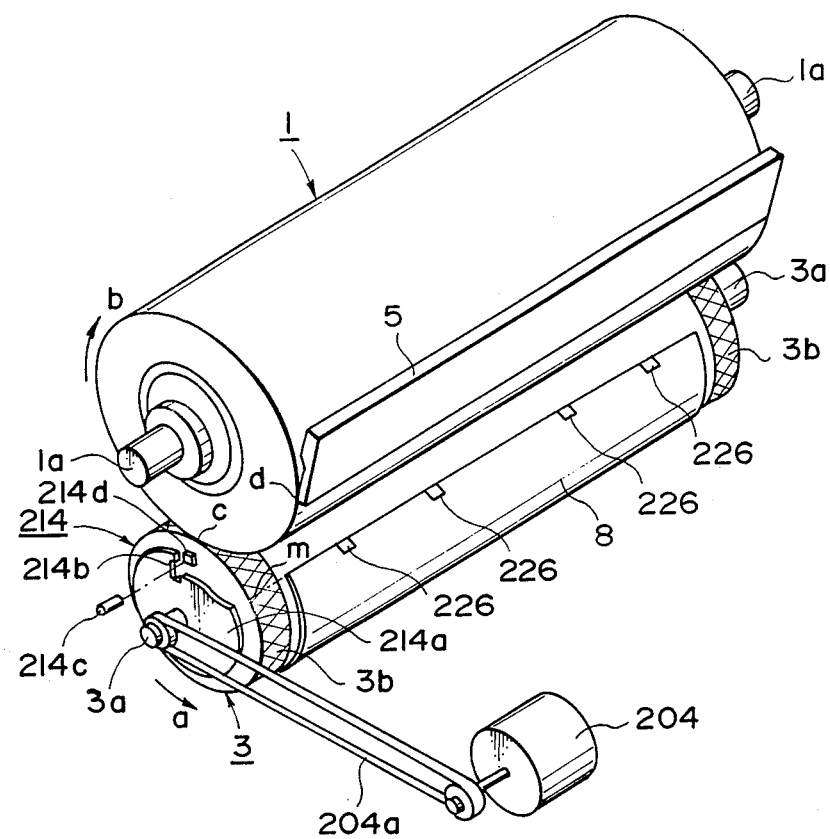
FIG. 25 is a perspective view for explaining the relationship between an ink roller and a pressure roller in the apparatus in FIG. 22.

A shaft 3a extending through the pressure roller 3 is pivotally supported by side plates 218. As shown in FIG. 25, the shaft 3a is coupled to a driving motor 204 through a belt 204a, as shown in FIG. 25 and is rotated in a direction of arrow a upon driving of the motor 204. Knurled portions 3b are formed at the longitudinal end portions of the roller 3. Upon rotation of the pressure roller 3, the knurled portions 3b catch the ink roller 1 to drive the ink roller 1.

A detecting means 213 is arranged at a determined position of the conveying means 7 to detect the presence/absence of the record sheet 8. A position control means 214 is arranged at a determined position of the pressure roller 3 to cause the pressure roller 3 to stop at a determined position for each color record cycle (FIG. 25).

Figure 26:
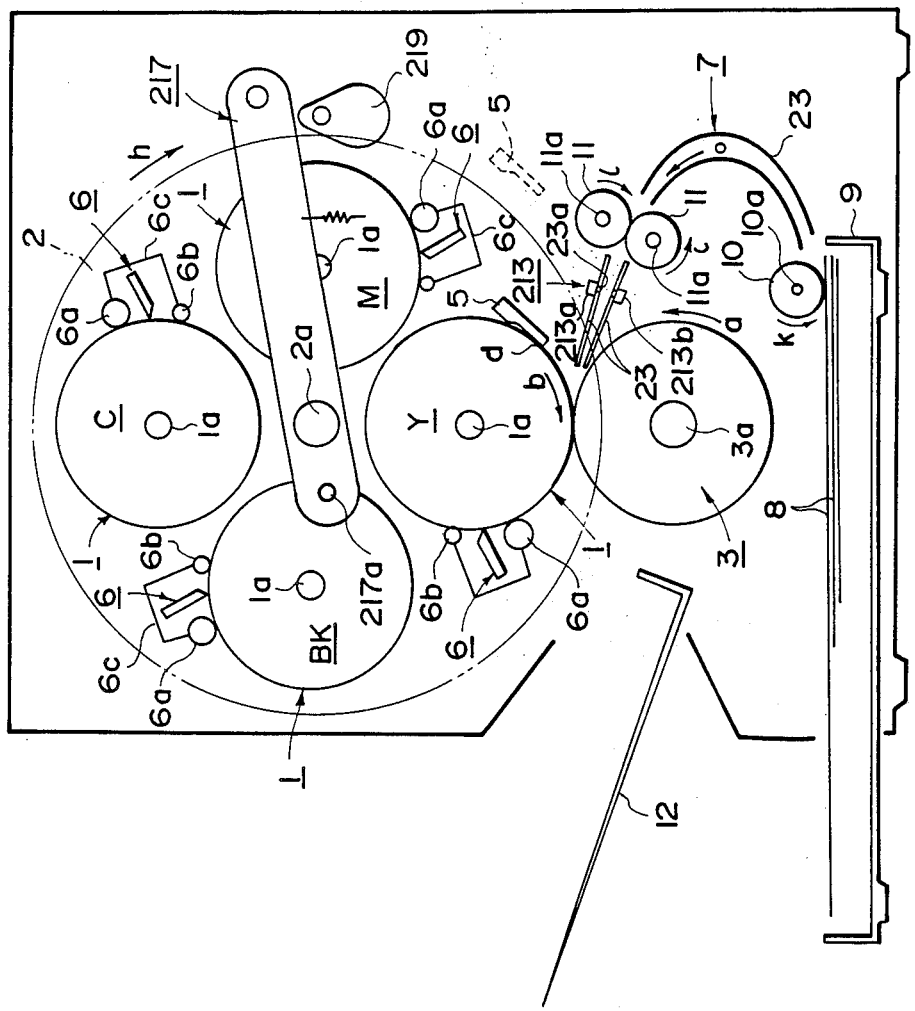
FIG. 26 is a schematic sectional view of a recording apparatus according to still another embodiment of the present invention.

The sheet detecting means 213 is arranged at a determined position in the sheet conveyance path constituted by sheet guides 23. The detecting means 213 will be described below. As shown in FIG. 26 detection windows 23a are formed at opposite positions in the sheet guides 23 located between the timing rollers 11 and the pressure roller 3 so as to interpose the sheet conveyance path therebetween. A light-emitting element 213a is arranged at one window 23a, and a light-receiving element 213b is arranged at the other window 23a. Light from the light-emitting element 213a is adapted to be received by the light-receiving element 213b. The light-receiving element 213b is connected to a controller for controlling record operation in response to a signal from the light-receiving element 213b. If the detecting means 213 does not detect the record sheet 8 even if the record sheet 8 is conveyed by the feed roller 10 and the timing rollers 11, record operation is interrupted.

A plurality of grippers 226 are arranged at determined positions in line on the surface of the pressure roller 3.

The grippers 226 grip the leading edge of the record sheet 8 conveyed in the pressure roller 3. As shown in FIG. 27, each gripper 226 can be swung about a shaft 226a and is always biased by a torsion spring 226b to be normally closed with respect to the outer surface of the pressure roller 3. When the grippers 226 are closed, the outer surfaces of the grippers 226 have substantially the same level as that of the outer surface of the pressure roller 3 and do not extend thereon.

A cam follower 226c extending inward of the hollow pressure roller 3 is integrally mounted with the gripper 226, and an opening/closing control cam plate 226d is not rotated about the shaft 3a of the pressure roller 3 but can be slid along the axial direction thereof. The control cam plate 226d is connected to a solenoid 226e. When the solenoid 226e is deenergized, the control cam plate 226d is located outside the rotational path of the cam follower 226c. As a result, the grippers 226 are kept closed. However, when the solenoid 226e is energized, the control cam plate 226d is slid along the axial direction and located within the rotational path of the cam follower 226c to push the cam follower 226c upward, thereby opening the grippers 226. The solenoid 226e for sliding the control cam plate 226d is operated in response to a determined signal from the controller during the recor operation.

A position control means 214 is arranged at one side surface of the pressure roller 3 to cause the pressure roller 3 to stop at a determined position after one color cycle is completed. The position control means 214 is arranged, as shown in FIG. 25. An aligning plate 214a is mounted on the shaft 3a of the pressure roller 3 and is rotated together with the roller 3. A slit 212b having a width of about 0.1 mm is formed at a determined positiin of the aligning plate 214a. A light source 214c l is mounted on the side plate 218 to emit light through the slit 214b. A detector 214d having a width of about 0.1 mm is mounted on the end face of the pressure roller 3 to receive light from the light source 214c through the slit 214b.

When the detector 214d receives the light from the light source 214c through the slit 214b, i.e., when the position of the detector 214d is aligned with the position of the light source 214c, the controller stops the pressure roller 3.

The light source 214c is located on a line perpendicular to a pressure contact portion c. When the pressure roller 3 is stopped as described above, an arc length cm of the pressure roller 3 from the pressure contact portion c to an end position of the record sheet 8 gripped by the grippers 226 is aligned with an arc length cd from the pressure contact portion c to a contact portion d.

Figure 28:
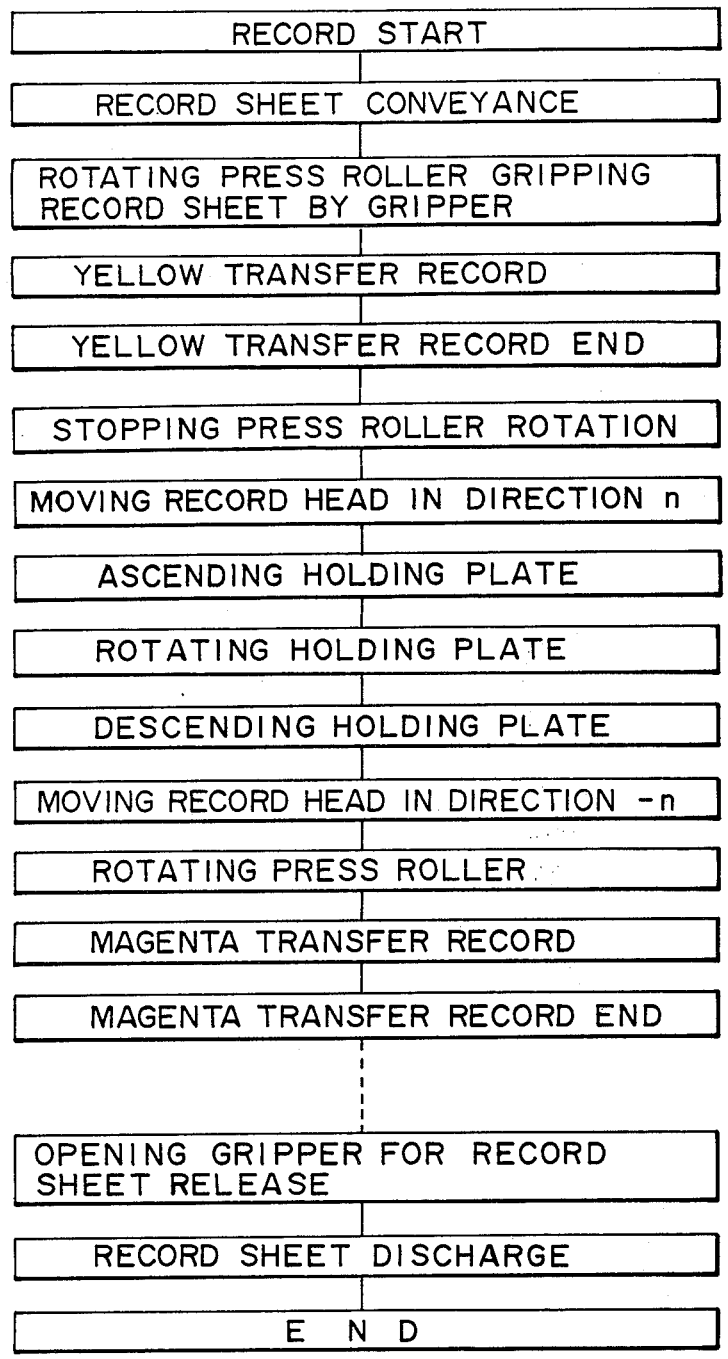
FIG. 28 is a flow chart for explaining color record operation.

The full-color transfer record operation in the recording apparatus having the arrangement described above will be described with reference to a flow chart in FIG. 28.

Assume that the yellow, magenta, cyan, and black rollers are subsequently subjected to transfer record operation. The yellow roller Y is brought into tight contact with the pressure roller 3, and at the same time, the record head 5 is brought into contact with the roller Y to start the yellow color record cycle. The feed roller 10 and the timing rollers 11 are respectively rotated in the directions of arrows k and l to separate the record sheets 8 from the cassette 9 one by one. The separated record sheet 8 is conveyed in the pressure roller 3. In synchronism with this, the pressure roller 3 is rotated to grip the leading end of the record sheet 8 with the grippers 226 and is rotated in the direction of arrow a. Therefore, the yellow roller Y is driven in the direction of arrow b. Upon rotation of the yellow roller Y, the record head 5 is heated on the basis of image information. The yellow ink on the yellow roller Y is heated and melted in an image pattern. The ink maintains the melted state and reaches the pressure contact portion c upon rotation of the yellow roller Y. At the pressure contact portion c, the melted ink in the image pattern is transferred onto the record sheet 8, thereby completing yellow transfer.

Small indentations are left on the surface of the yellow roller Y after the ink transfer is completed. When the yellow roller Y is rotated and reaches the smoothing blade 6, the surface of the roller Y is heated by the blade 6 and the small indentations are eliminated to obtain a smooth surface. In this case, heating by the front and rear rollers 6a and 6b further improves the smoothing effect.

When the yellow transfer is completed, as described above, the grippers 226 on the pressure roller 3 continuously grip the leading end of the record sheet and are stopped by the position control means 214 at a position where the arc length cm is equal to the arc length cd.

The motor 19f is driven to rotate lead screw members 19, and the record head 5 is guided along the lead screw members 19, thereby retracting the record head 5 in the direction of arrow n of FIG. 22. After the record head 5 is retracted, the motor 219a is driven to rotate the eccentric cams 219 in a direction of arrow i, and the arms 217 are rotated upward about the shaft 217a. The holding plates 202 are ascended to release the contact between the yellow roller Y and the pressure roller 3.

When the contact state is cancelled, a motor 202d is driven to rotate the holding plates 202 through 90° in the direction of arrow h, so that the magenta roller M opposes the pressure roller 3. In the reverse manner as described above, the holding plates 202 are descended to bring the magenta roller M into tight contact with the pressure roller 3. The record head 5 is slid in the −n direction and brought into contact with the magenta roller M.

Magenta transfer is performed in the same manner as in the yellow transfer. Cyan and black transfer operations are subsequently performed. When the black transfer is completed, the grippers 226 are opened to release the record sheet 8 from the pressure roller 3. The released sheet is delivered outside onto the sheet tray 12. A full-color image is recorded on the sheet 8 on the tray 12. During record operation, the record start point is monitored by the position control means 213 to prevent color misregistration.

In this embodiment, the record sheet 8 is held on the peripheral surface of the press roller 3 since the gripper 226 grips the edge of the record sheet 8. After this, a yellow image, magenta image, cyan image and black image are transferred in sequence and superimposed on the record sheet. After transferring of the black image, the motor 219a is driven in order to rotate the holding plate 202 in the h direction and release the pressed state of the black roller BK and the press roller 3. The solenoid 226e is energized and the gripper 226 is released. Further, the motor 204 is driven to rotate the press roller 3 in the arrowed direction and by this rotational force, the record sheet to be recorded is fed out to the tray 12. The motor 219a is driven to rotate the holding plate 202 in the h direction and the yellow roller Y and the press roller 3 are brought into the pressed state.

Finally, when the recording is initiated by pressing the yellow roller Y to the record head 5, a new record sheet is fed out by the supply roller 10 from the cassette 9. The fed out record sheet is then fed to the pressing position between the yellow roller Y and the press roller 3 synchronizing with the image formed on the yellow roller Y by the timing roller 11. The edge of the record sheet is gripped by the gripper 226 and the transferring and the superimposing are subsequently performed as stated above.

When the transfer operation progresses, the diameter of the ink roller 1 is decreased. However, the corresponding core 1a is slid along the elongated holes 202b, and the ink roller 1 is kept in tight contact with the pressure roller 3 at a determined pressure regardless of changes in ink roller diameter. Sliding of the core 1a- causes rotation of the pivot plates 215 in the direction of arrow f. The link member 216, one end of which abuts against the lower end of the corresponding pivot plate 215, is rotated in the direction of arrow g. The shaft 6d of the smoothing blade 6 is slid along the guide holes 202c toward the direction of the ink roller 1. The smoothing blade 6 is thus kept in contact with the surface of the ink roller 1.

Even if the ink roller diameter is changed, the arc length from the contact portion d to the pressure contact portion c must be kept unchanged. Referring back to FIGS. 4A and 4B, since the record head 5 is biased by the eccentric cams 17 in the direction of arrow F, the record head 5 is slid such that the guide projections 15b of the support 15 are slid along the arcuated elongated holes 16 while the support projections 16b the support side plates 16 serve as pivot points. Therefore, the contact angle between the ink roller 1 and the record head and the arc length from the contact portion d to the pressure contact portion c are kept unchanged.

If the record sheet 8 is not detected by the detecting means 213 even if the feed roller 10 and the timing rollers 11 are rotated by a determined number of times, record operation is stopped.

More specifically, when the record sheet 8 is conveyed by the timing rollers 11 by a determined number of lines, light from the light-emitting element 213a is shielded by the conveyed record sheet 8 and is not received by the light-receiving element 213b any longer. However, if the record sheet 8 is absent or subjected to jam, the light from the light-emitting element 213a is not shielded by the sheet 8 even if the timing rollers 11 convey the sheet 8 by the determined number of lines. In other words, light from the light-emitting element 213a is kept received by the light-receiving element 213b. In this manner, the presence/absence of the record sheet 8 can be detected. If the sheet 8 is not detected, the record operation is interrupted.

If record operation continues even if the record sheet 8 is not conveyed, the ink melted by the record head 5 contaminates directly the surface of the pressure roller 3. In the subsequent record cycles, the lower surfaces of the record sneets 8 are contaminated. However, in this embodiment, the behavior of the detecting means 213 prevents such inconvenience.

In the above embodiment, four ink rollers 1 are sequentially used to perform full-color record operation. However, the ink rollers may be selectively used to perform full-color record operation.

The number of ink rollers 1 is not limited to four, but can be easily changed as needed The pressure roller 3, the feed roller 10, and the timing rollers comprise roller-like members in the above embodiment. However, they may be replaced with rotary belts or the like to obtain the same effect as in the above embodiment.

In the above embodiment, the transfer medium comprises an ink roller, but the ink roller may be replaced with a member obtained by coating the supercoolable ink on the surface of a rotary drum or the like.

In the above embodiment, since the plurality of transfer media having different colors are used, multicolor record operation can be easily performed.

In each embodiment described above, the heating head is used to melt or soften the transfer medium. However, the present invention is not limited to this. For example, a record electrode and a return path electrode is energized near an ink roll, the surface of which is conductive by dispersing conductive particles thereon. The outer surface of the ink roll may be heated by Joule heat to melt or soften the ink in a determined pattern.

As described above, the present invention provides recording apparatuses for recording clear images at low running cost.

What is claimed is:

1. A recording apparatus for recording an image on a record medium, comprising:
   a transfer medium transferable on the record medium to record the image;
   drive means for rotating said transfer medium;
   recording means for effecting a recording position of said transfer medium in response to image information, and setting said transfer medium in a transferable condition to record the image;
   pressing means for pressing the record medium to said transfer medium in a transferring position so as to transfer said transfer medium onto the record medium; and
   maintaining means for maintaining a substantially constant distance between the recording position of said recording means and the transferring position of said pressing means regardless of a variation in size of said transfer medium.

2. An apparatus according to claim 1, wherein said maintaining means comprises sliding means for sliding said recording means on the basis of a change in outer diameter of said transfer medium.

3. An apparatus according to claim 1, wherein an angle between said recording means and a normal at said recording means contact position of said transfer medium is kept unchanged.

4. An apparatus according to claim 1, wherein conveying means for conveying said record medium to the transferring position applies a predetermined pressure to said record medium.

5. An apparatus according to claim 1, further comprising means for separating said recording means and said pressing means from said transfer medium in a non-record state.

6. An apparatus according to claim 1, wherein said pressing means for pressing the record medium on a surface of said transfer medium and cooperates with said transfer medium to convey the record medium.

7. An apparatus according to claim 1, wherein said pressing means rotates in contact with said transfer medium and drives said transfer medium.

8. An apparatus according to claim 1, further comprising a smoothing member for smoothing a surface of said transfer medium, said recording means and said pressing means being separated from the surface of said transfer medium while said smoothing member is kept in contact with the surface of said transfer medium.

9. An apparatus according to claim 1, further comprising an inverted crown-like regulating means brought into tight contact with said transfer medium.

10. An apparatus according to claim 1, further comprising an indentation member rotatably brought into contact with a surface of said transfer medium.

11. An apparatus according to claim 1, further comprising cleaning means for retracting said recording means from said transfer medium and cleaning a surface of said transfer medium.

12. An apparatus according to claim 1, wherein said pressing means is adapted to bring a record medium into contact with a surface of said transfer medium for a predetermined period of time.

13. An apparatus according to claim 12, wherein the predetermined period of time for which the record medium is kept in contact with the surface of said transfer medium by said pressing means is variable.

14. An apparatus according to claim 1, further comprising particle removing means, disposed near said transfer medium, for removing particles from a surface of said transfer medium, and means for bringing said transfer medium into contact with said particle removing means.

15. An apparatus according to claim 1, further comprising detecting means for detecting a diameter of said transfer medium and a controller for generating a record interruption signal in response to a determined signal from said detecting means.

16. A recording apparatus according to claim 1, wherein said transfer medium comprises ink having supercoolable properties.

17. A recording apparatus according to claim 1, wherein said transfer medium is formed with ink which can maintain a viscous state during a predetermined heat-fusible period, in which said transfer medium is transferred on the record medium during the predetermined period after heating.

18. A recording apparatus according to claim 1, wherein said transfer medium has a cylindrical shape and the diameter of said transfer medium is gradually reduced in response to transferring an image to said record medium during recording.

19. A recording apparatus according to claim 1, said transfer medium being cylindrical in shape and is rotatably disposed in said apparatus and is adjustable in a vertical direction.

20. A recording apparatus according to claim 1, wherein the transferring position of said transfer medium is a fixed position.

21. An apparatus for recording an image, comprising:
a rotatable holding member;
a plurality of transfer media rotatably mounted on said holding member and having an identical color;
recording means for heating a surface of one of said transfer media on the basis of image information; and
a pressure member for rotating one of said transfer media in response to record operation and adapted to bring a record medium into contact with the surface of one of said transfer media in a transferring position.

22. A recording apparatus according to claim 21, wherein said transfer media comprises ink having supercoolable properties.

23. A recording apparatus according to claim 21, wherein said transfer media is formed with ink which can maintain a viscous state during a predetermined heat-fusible period, in which said transfer media is transferred on the record medium during the predetermined period after heating.

24. A recording apparatus according to claim 21, wherein said transfer media has a cylindrical shape and the diameter of said transfer media is gradually reduced in response to transferring an image to said record medium during recording.

25. A recording apparatus according to claim 21, said transfer media being cylindrical in shape and is rotatably disposed in said apparatus and is adjustable in a vertical direction.

26. A recording apparatus according to claim 21, wherein the transferring position of said transfer media is a fixed position.

27. An apparatus for recording an image, comprising:
a holding member rotatable stepwise;
a plurality of transfer media rotatably mounted on said holding member and having different colors;
recording means for heating a surface of one of said transfer media on the basis of image information;
pressing means for rotating one of said transfer media in response to record operation and adapted to bring a record medium into contact with the surface of one of said transfer media in a transferring position; and
conveying means for conveying the record medium in response to the record operation.

28. An apparatus according to claim 27, further comprising position control means for stopping rotation of said pressing means at a predetermined position.

29. An apparatus according to claim 27, further comprising detecting means for detecting a state where the record medium is not normally conveyed, and means for releasing a contact between said transfer media and said pressing means in response to a detection signal from said detecting means.

30. A recording apparatus according to claim 27, wherein said transfer media comprises ink having supercoolable properties.

31. A recording apparatus according to claim 27, wherein said transfer media is formed with ink which can maintain a viscous state during a predetermined heat-fusible period, in which said transfer media medium is transferred on the record medium during the predetermined period after heating.

32. A recording apparatus according to claim 27, wherein said transfer media has a cylindrical shape and the diameter of said transfer media is gradually reduced in response to transferring an image to said record medium during recording.

33. A recording apparatus according to claim 27, said transfer media being cylindrical in shape and is rotatably disposed in said apparatus and is adjustable in a vertical direction.

34. A recording apparatus according to claim 27, wherein the transferring position of said transfer media is a fixed position.

* * * * *

UNITED STATES PATENT AND TRADEMARK OFFICE
CERTIFICATE OF CORRECTION

PATENT NO. : 4,768,041
DATED : August 30, 1988
INVENTOR(S) : TADASHI SATO, ET AL.

It is certified that error appears in the above-identified patent and that said Letters Patent is hereby corrected as shown below: Title page:

AT [56] IN THE REFERENCES

Other Publications, under "Humphreys," "Color Wheel with Ink Platens," should read --Color Wheel with Inked Platens,--.

COLUMN 1

Line 51, "the priority based on" should read --priority based on the--.

COLUMN 3

Line 6, "of" should read --the--.
    Line 38, "*" should be deleted.
    Line 60, "smooths" should read --smoothes--.

COLUMN 5

Line 58, "inserted" should read --inserted in--.

COLUMN 8

Line 66, "locking projection 6c" should read --locking projection 6d--.

COLUMN 9

Line 55, "siding" should read --sliding--.
    Line 56, "6balong" should read --6b along--.

UNITED STATES PATENT AND TRADEMARK OFFICE
CERTIFICATE OF CORRECTION

PATENT NO. : 4,768,041
DATED : August 30, 1988
INVENTOR(S) : TADASHI SATO, ET AL.

It is certified that error appears in the above-identified patent and that said Letters Patent is hereby corrected as shown below:

COLUMN 11

Line 54, "extending" should read --extends--.
    Line 55, "25 rotatably" should read --25a are rotatably--.

COLUMN 12

Line 59, "rotaty" should read --rotary--.

COLUMN 13

Line 18, "controller 124" should read --controller 124j--.
    Line 29, "rotaty" should read --rotary--.
    Line 64, "arrangement" should read --arrangement, when--.
    Line 65, "cleaning unit 124" should read --cleaning unit 124k--.

COLUMN 14

Line 5, "band 124" should read --band 124m--.

COLUMN 16

Line 35, "signal, the" should read --signal, and the--.
    Line 42, "When light" should read --Light--.

COLUMN 17

Line 35, "eliminated" should read --eliminate--.
    Line 40, "However, since the" should read --The--.

UNITED STATES PATENT AND TRADEMARK OFFICE
CERTIFICATE OF CORRECTION

PATENT NO. : 4,768,041

DATED : August 30, 1988

INVENTOR(S) : TADASHI SATO, ET AL.

It is certified that error appears in the above-identified patent and that said Letters Patent is hereby corrected as shown below:

COLUMN 20

Line 61, "ot" should read --of--.

COLUMN 21

Line 27, "is" should be deleted.
    Line 33, "tne" should read --the--.

COLUMN 22

Line 1, "cannot" should read --can--.
    Line 15, "brought" should read --is brought--.
    Line 65, "record sheet" should read --record sheet 8--.

COLUMN 23

Line 4, "kept" should be deleted.
    Line 8, "continuous" should read --continues--.
    Line 16, "sneet 8" should read --sheet 8--.
    Line 17, "tne" should read --the--.
    Line 19, "cams 319" should read --cams 219--.

COLUMN 25

Line 11, "recor" should read --record--.
    Line 18, "slit 212b" should read --slit 214b--.
    Line 20, "iin" should read --ion.
    Line 20, "1" should be deleted; "is" should be in regular typeface.
    Line 21, text should be in regular typeface.
    Line 22, "214b." should be in regular typeface.

UNITED STATES PATENT AND TRADEMARK OFFICE
CERTIFICATE OF CORRECTION

PATENT NO. : 4,768,041

DATED : August 30, 1988

INVENTOR(S) : TADASHI SATO, ET AL.

It is certified that error appears in the above-identified patent and that said Letters Patent is hereby corrected as shown below:

COLUMN 27

Line 15, "arrow F," should read --arrow f,--.
    Line 17, "holes 16" should read --holes 16a--.
    Line 37, "kept" should be deleted.
    Line 45, "sneets 8" should read --sheets 8--.

COLUMN 28

Line 46, "for pressing" should read --presses--.

COLUMN 30

Line 43, "me-" should be deleted.
    Line 44, "dium" should be deleted.

Signed and Sealed this

Eleventh Day of July, 1989

Attest:

DONALD J. QUIGG

*Attesting Officer*      *Commissioner of Patents and Trademarks*